United States Patent [19]

Kawashima

[11] Patent Number: 5,818,911
[45] Date of Patent: Oct. 6, 1998

[54] INFORMATION COMMUNICATION SYSTEM AND TRANSMITTING AND TERMINAL APPARATUS FOR THE SAME

[75] Inventor: Isao Kawashima, Kanagawa, Japan

[73] Assignee: Sony Corporation, Tokyo, Japan

[21] Appl. No.: 500,808

[22] Filed: Jul. 11, 1995

[30] Foreign Application Priority Data

Jul. 14, 1994 [JP] Japan ..................................... 6-161772

[51] Int. Cl.$^6$ .................................................. H04M 11/00
[52] U.S. Cl. ..................................... 379/90.01; 379/92.01; 379/93.07; 379/93.25; 379/102.03; 348/6; 455/6.3
[58] Field of Search ............................. 455/2–6.3, 38.2, 455/38.3, 101; 340/825, 825.03–825.07, 825.15; 348/1, 3, 6, 7, 10, 12, 13, 388, 389, 426; 379/92.01–93.01, 93.05, 93.07, 93.12, 93.14, 93.15, 100.12, 102.01–102.04, 90.01

[56] References Cited

U.S. PATENT DOCUMENTS

| | | | |
|---|---|---|---|
| 4,499,568 | 2/1985 | Gremillet | 348/7 |
| 4,630,108 | 12/1986 | Gomersall | 348/13 |
| 4,890,322 | 12/1989 | Russell, Jr. | 455/5.1 |
| 5,245,429 | 9/1993 | Virginio et al. | 348/426 |
| 5,247,575 | 9/1993 | Sprague et al. | 348/3 |
| 5,260,778 | 11/1993 | Kauffman et al. | 348/6 |
| 5,504,933 | 4/1996 | Saito | 348/3 |
| 5,534,913 | 7/1996 | Majeti et al. | 348/7 |
| 5,548,635 | 8/1996 | Bradley et al. | 379/102.03 |

Primary Examiner—Stella Woo
Attorney, Agent, or Firm—Limbach & Limbach L.L.P.

[57] ABSTRACT

An information communication system that includes a transmitter, a communication network and at least one terminal apparatus connected with the transmitter through the communication network. The transmitter transmits information to be offered to users. The transmitter includes an adding circuit and a selecting circuit. The adding circuit adds an identification code regarding distribution of the information. The transmitter transmits first and second pieces of information having different kinds of identification code. The terminal apparatus receives the information transmitted from the transmitter. The terminal apparatus also includes storing device for storing the transmitted information. The communication network includes a first communication transmission network for transmitting the first piece of information supplied from supplied from the transmitter to the terminal apparatus, a second communication transmission network for transmitting the second piece of information supplied from the transmitting means to the terminal apparatus, and a third communication transmission network for transmitting, from the terminal apparatus, information supplied to the transmitter. The selecting circuit of the transmitter supplies the first piece of information to the first communication transmission network and the second piece of information to the second communication transmission network depending on the identification code added by the adding circuit.

4 Claims, 21 Drawing Sheets

INFORMATION OFFERING SYSTEM

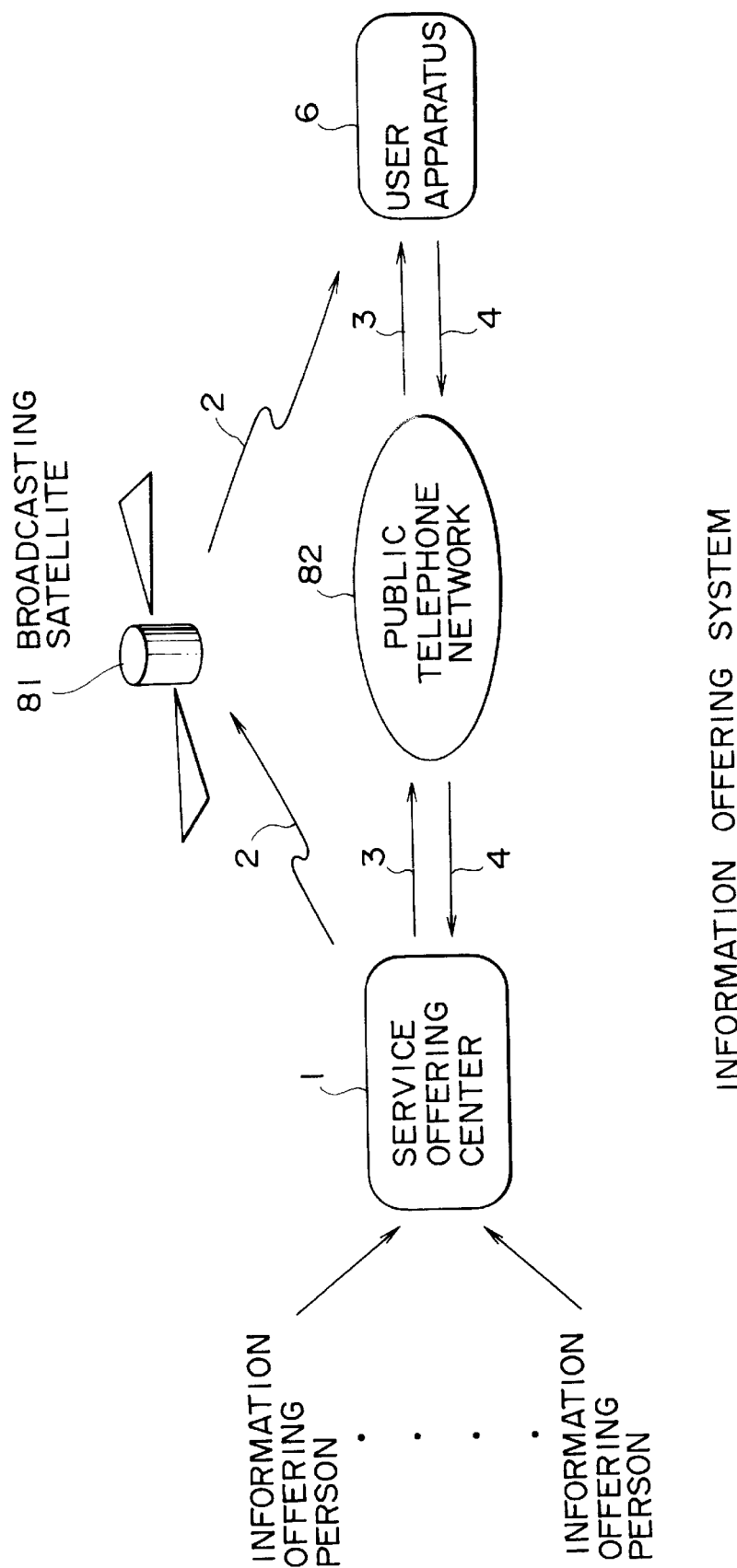

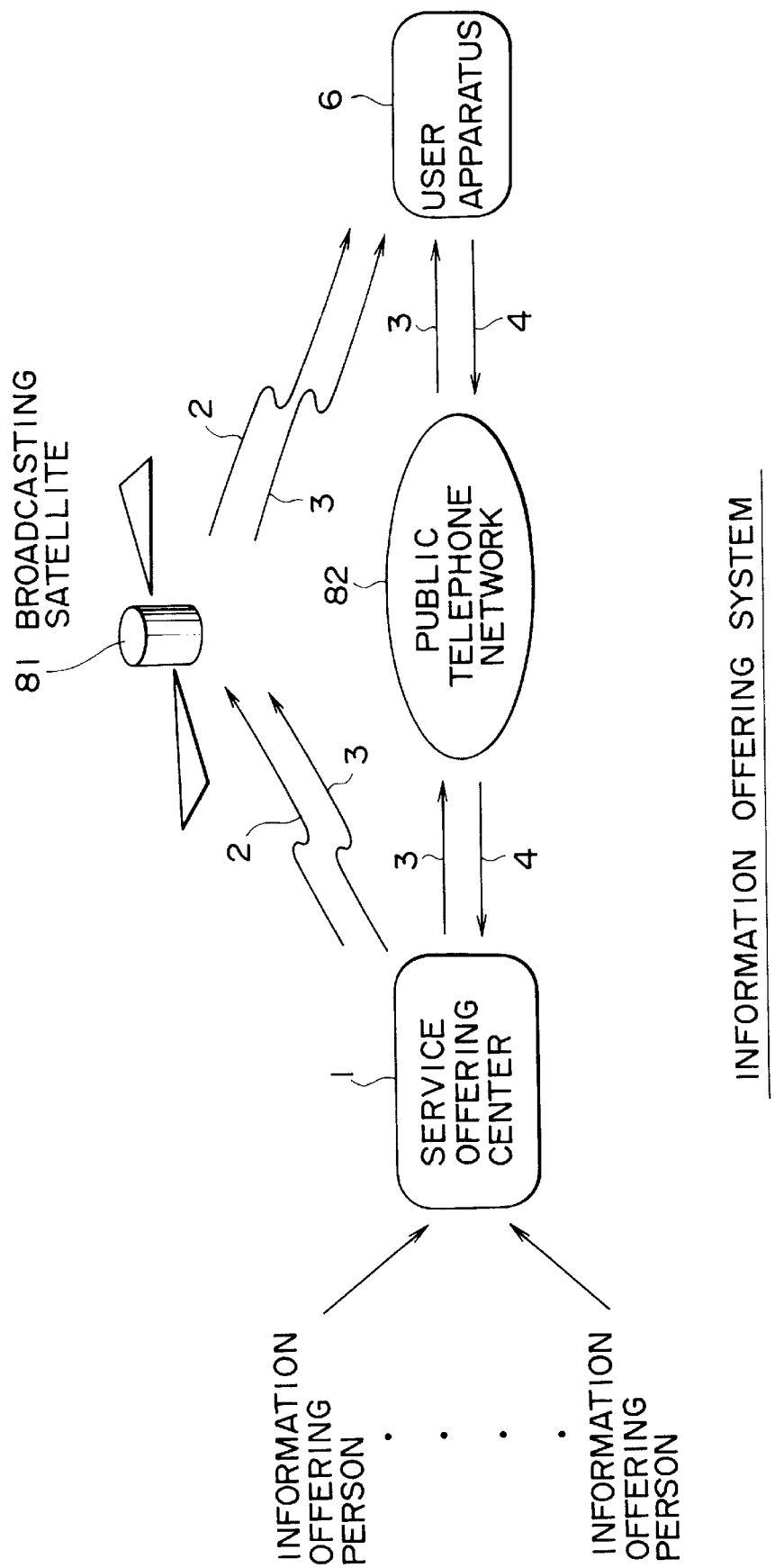

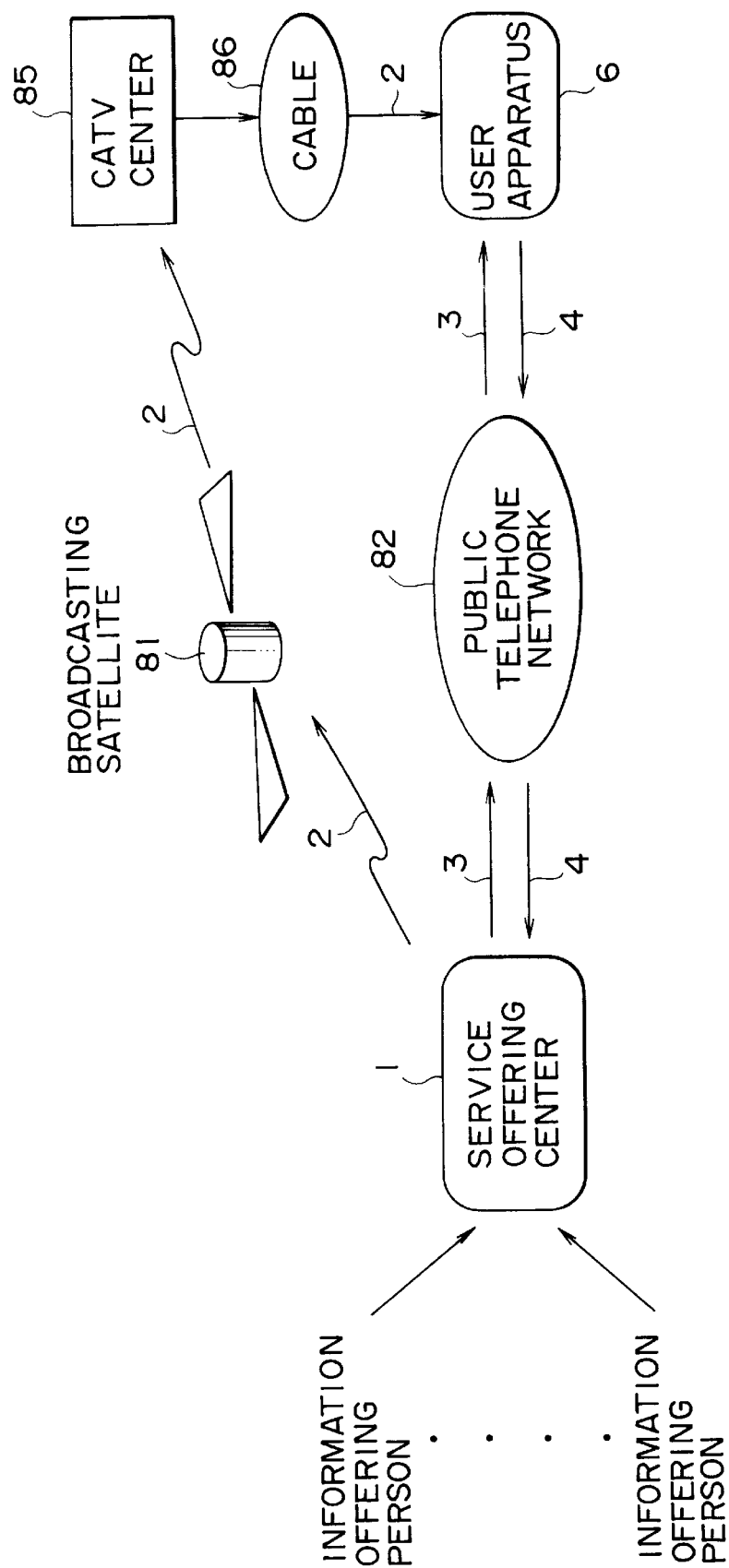

FIG. 8

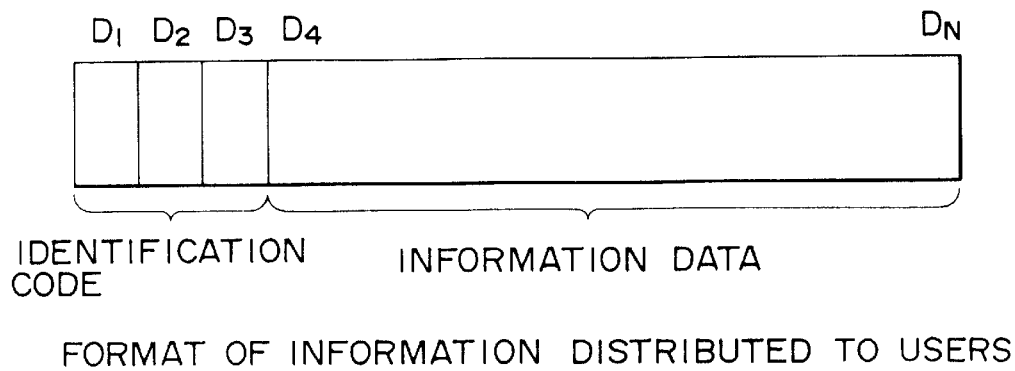

FORMAT OF INFORMATION DISTRIBUTED TO USERS

- $D_1$ : BIT FOR IDENTIFYING INFORMATION (1) TO BE DISTRIBUTED TO USERS OR INFORMATION (0) RECEIVED FROM USERS. THE PROCESSED INFORMATION BECOMES THE INFORMATION RECEIVED FROM USERS.

- $D_2$ : BIT FOR IDENTIFYING WHETHER THE INFORMATION DISTRIBUTED TO USERS OR THE INFORMATION RECEIVED FROM USERS IS THE INFORMATION (1) TO BE DISTRIBUTED TO THE SPECIFIED USERS OR THE INFORMATION (0) TO BE DISTRIBUTED TO UNSPECIFIED USERS.

- $D_3$ : BIT FOR IDENTIFYING, WHEN THE INFORMATION DISTRIBUTED TO USERS OR THE INFORMATION RECEIVED FROM USERS IS THE INFORMATION (1) TO BE DISTRIBUTED TO THE SPECIFIED USERS, WHETHER THE INFORMATION EXISTS IN LARGE AMOUNT (0) OR IS DISTRIBUTED TO COMPARATIVELY LARGE AMOUNT OF THE SPECIFIED USERS OR EXISTS IN SMALL AMOUNT (0) OR IS DISTRIBUTED TO A VERY SMALL NUMBER OF THE SPECIFIED USERS.

- $D_4$-$D_N$ : INFORMATION TO BE DISTRIBUTED TO USERS OR RECEIVED FROM USERS

IN : INFORMATION DISTRIBUTED TO USERS
(INFORMATION HAVING THE FIRST BIT $D_1$ OF 1)

A : INFORMATION DISTRIBUTED TO UNSPECIFIED USERS
(INFORMATION HAVING THE SECOND BIT $D_2$ OF 0)

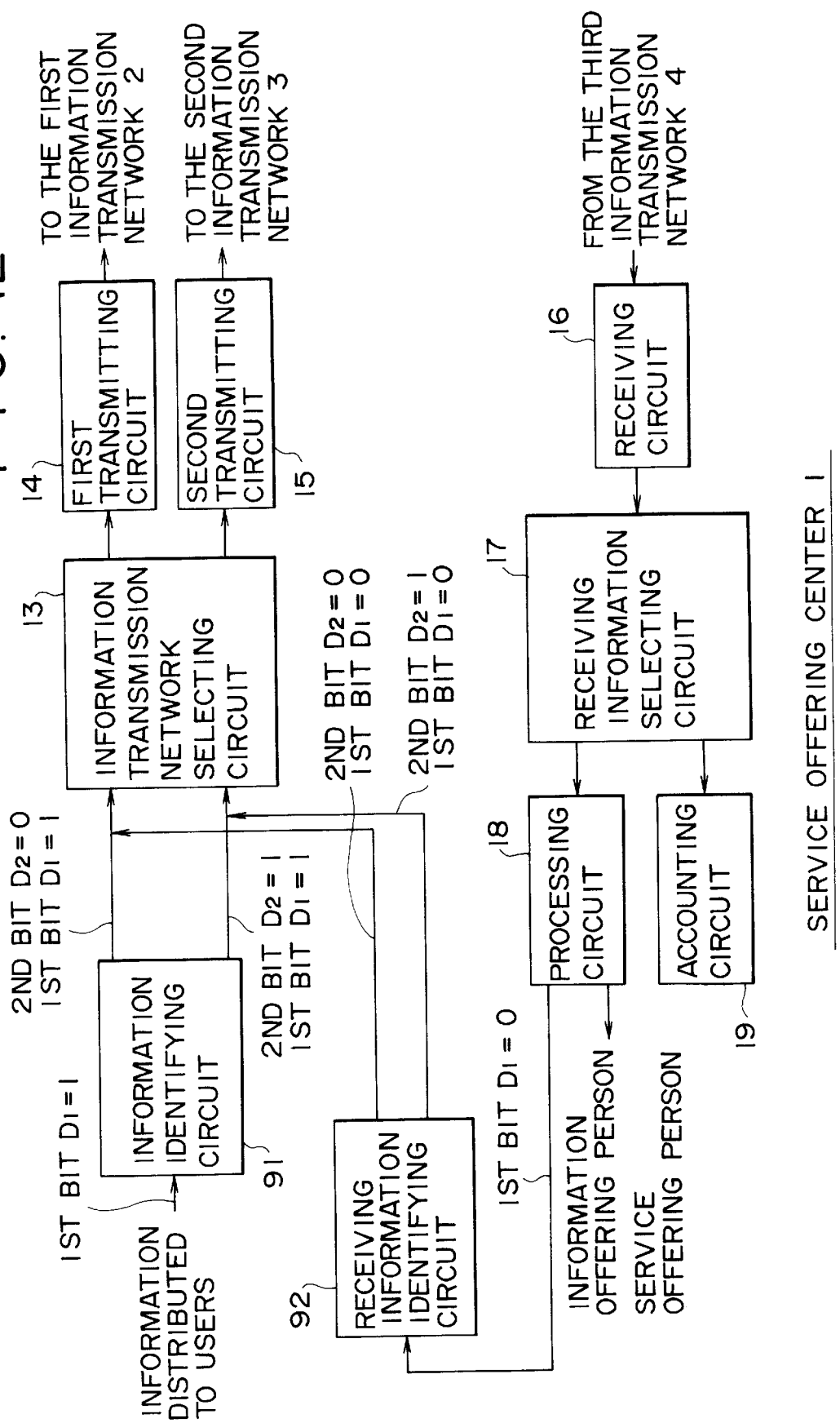

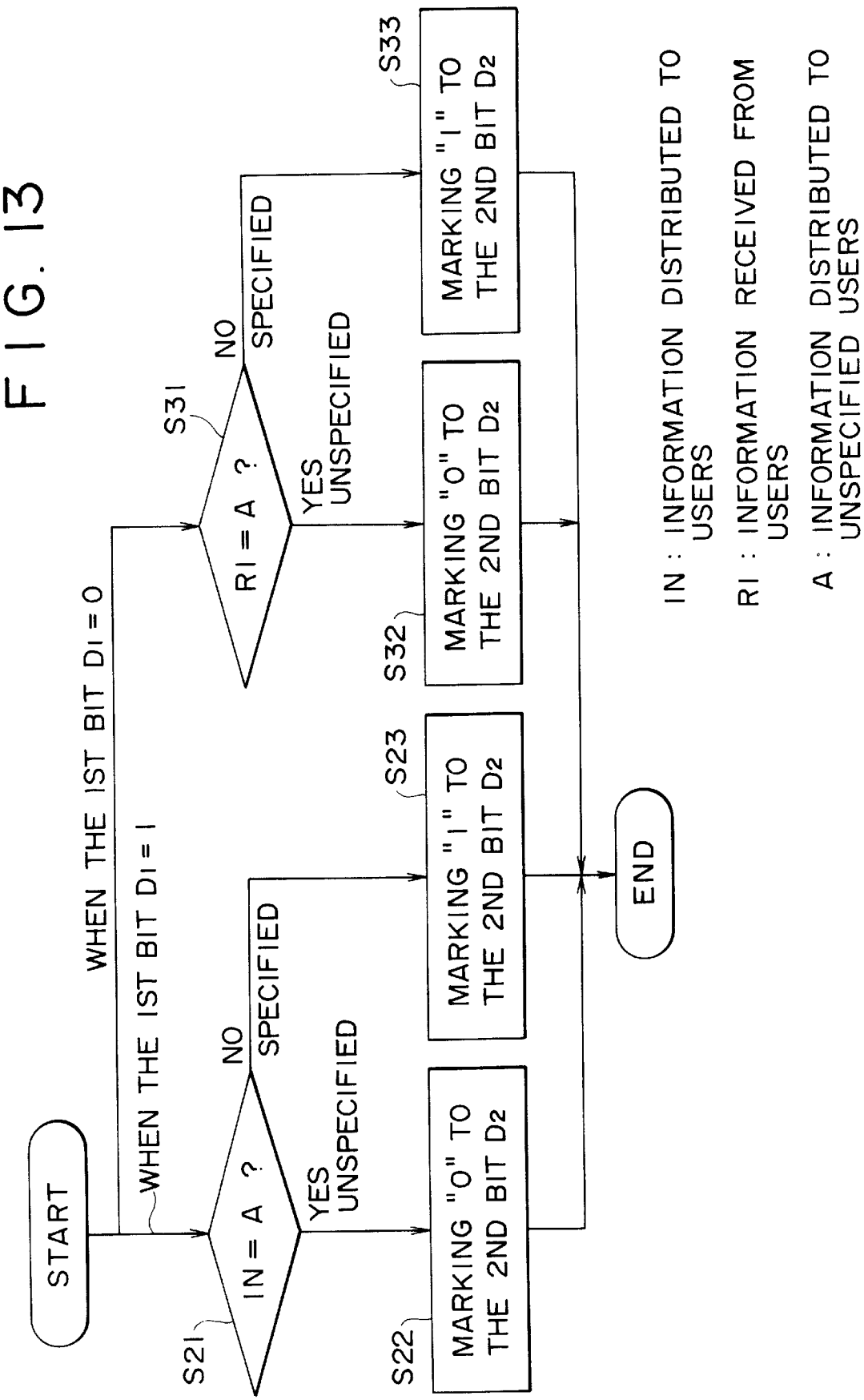

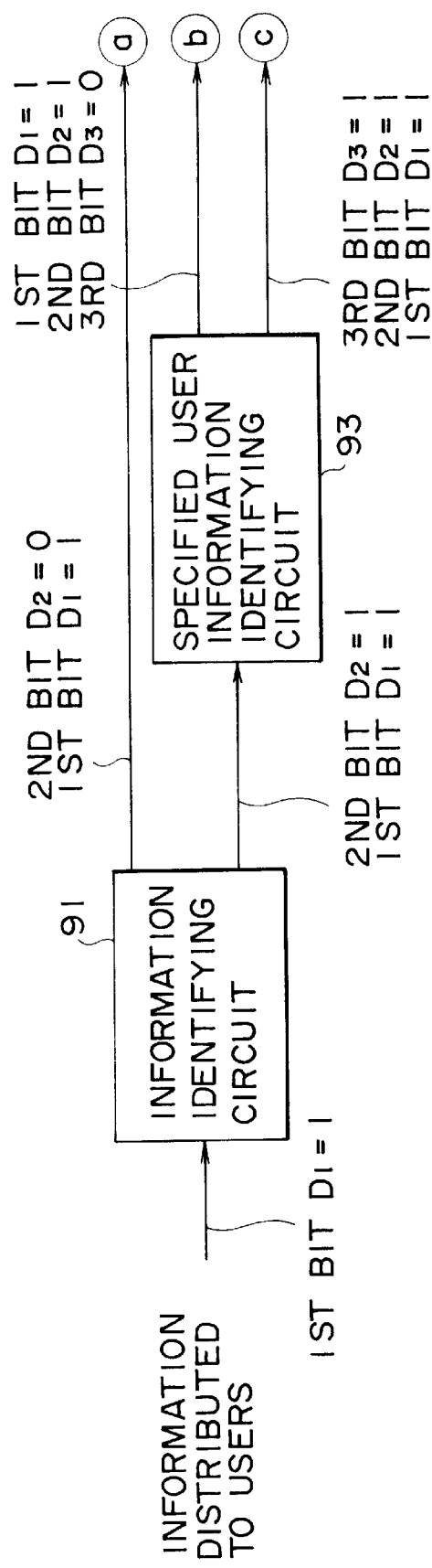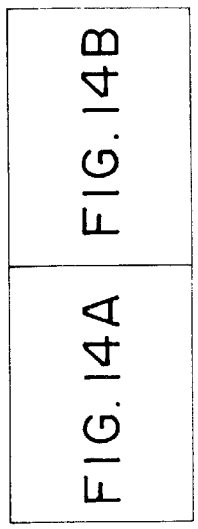

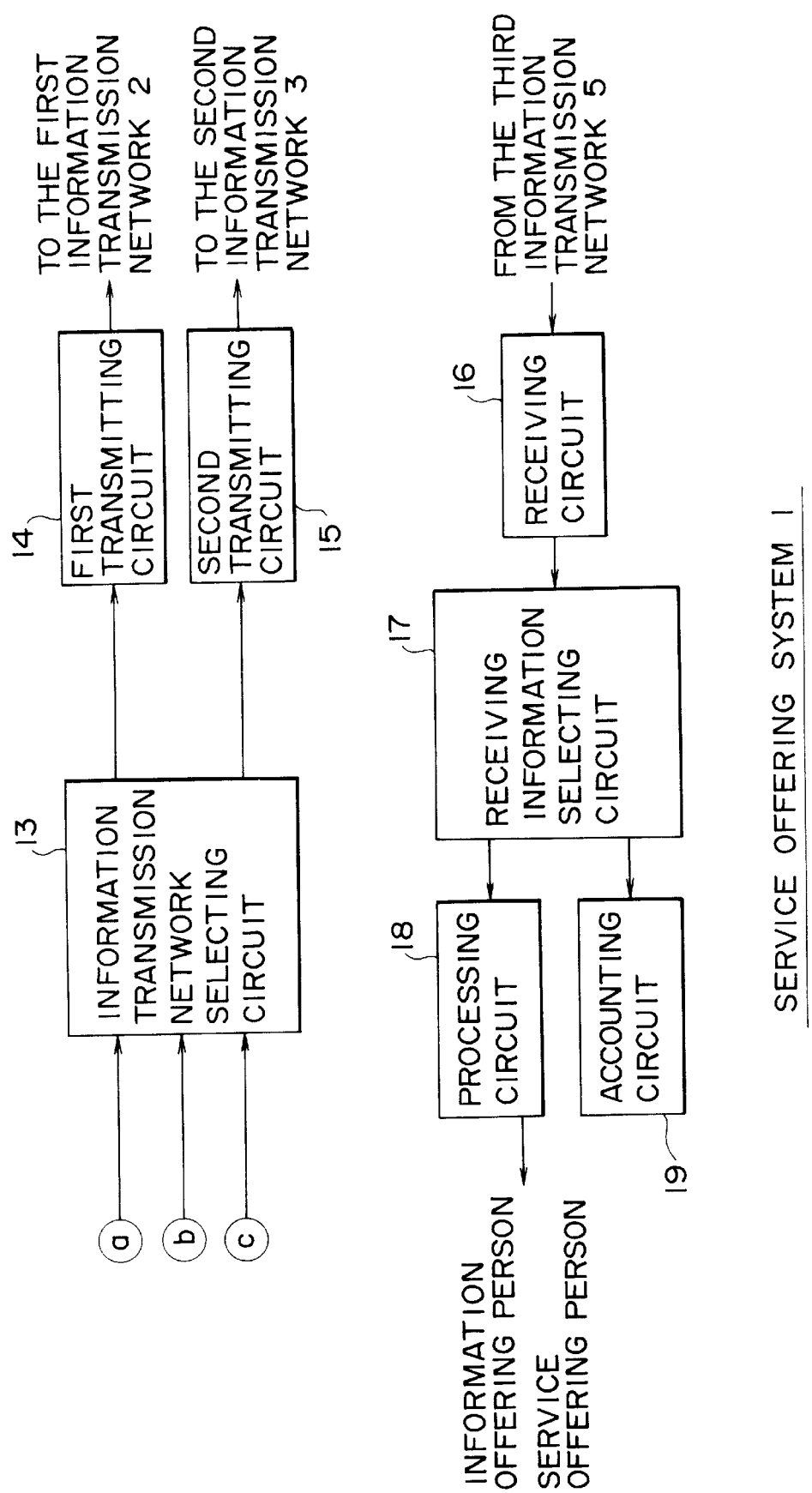

IN : INFORMATION DISTRIBUTED TO USERS
A : INFORMATION DISTRIBUTED TO UNSPECIFIED USERS
S : INFORMATION DISTRIBUTED TO THE SPECIFIED USERS
M : WHEN A LARGE AMOUNT OF INFORMATION IS DISTRIBUTED TO THE SPECIFIED USERS OR WHEN COMPARATIVELY LARGE AMOUNT OF THE SPECIFIED USERS EXIST IN WIDE RANGE

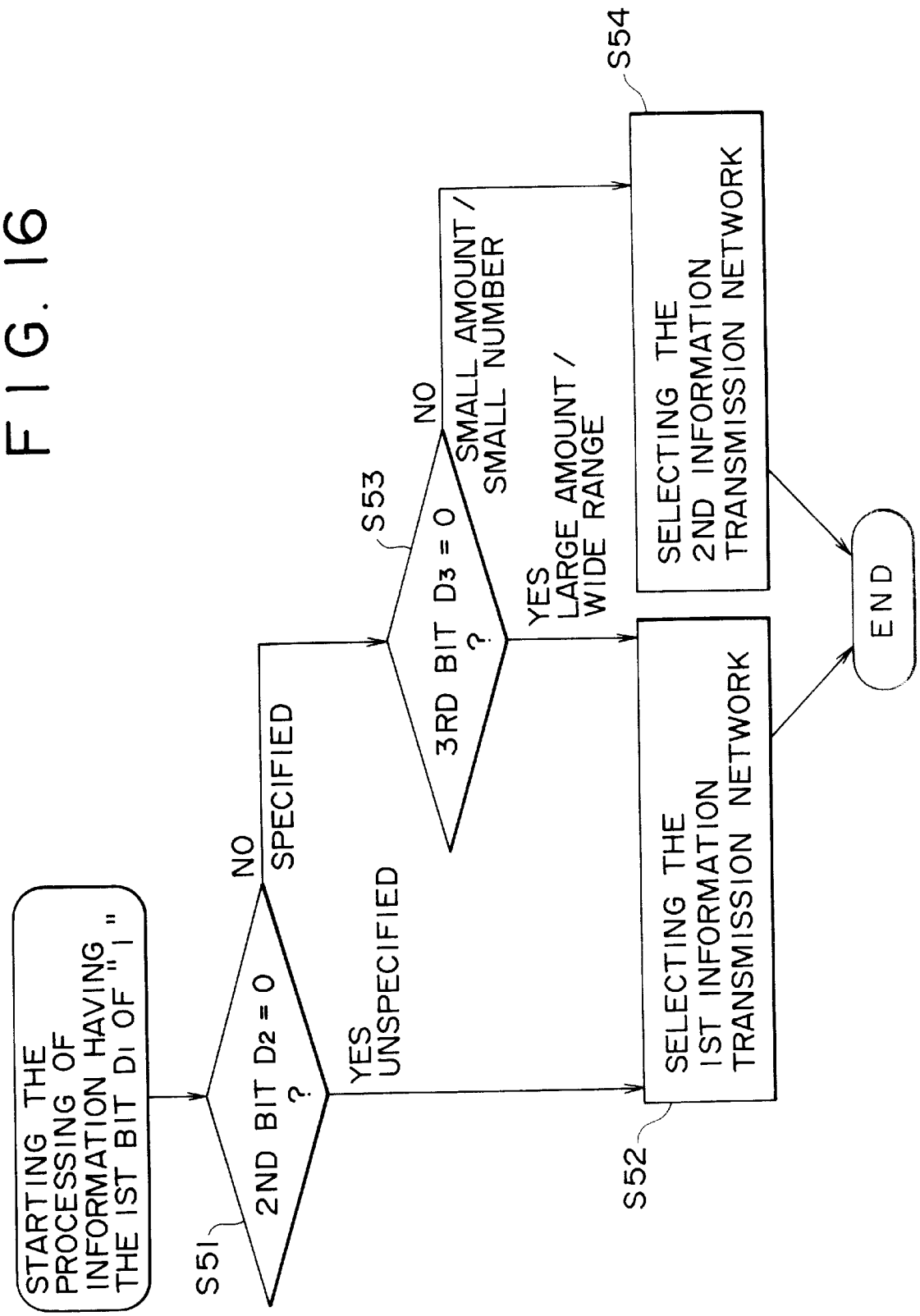

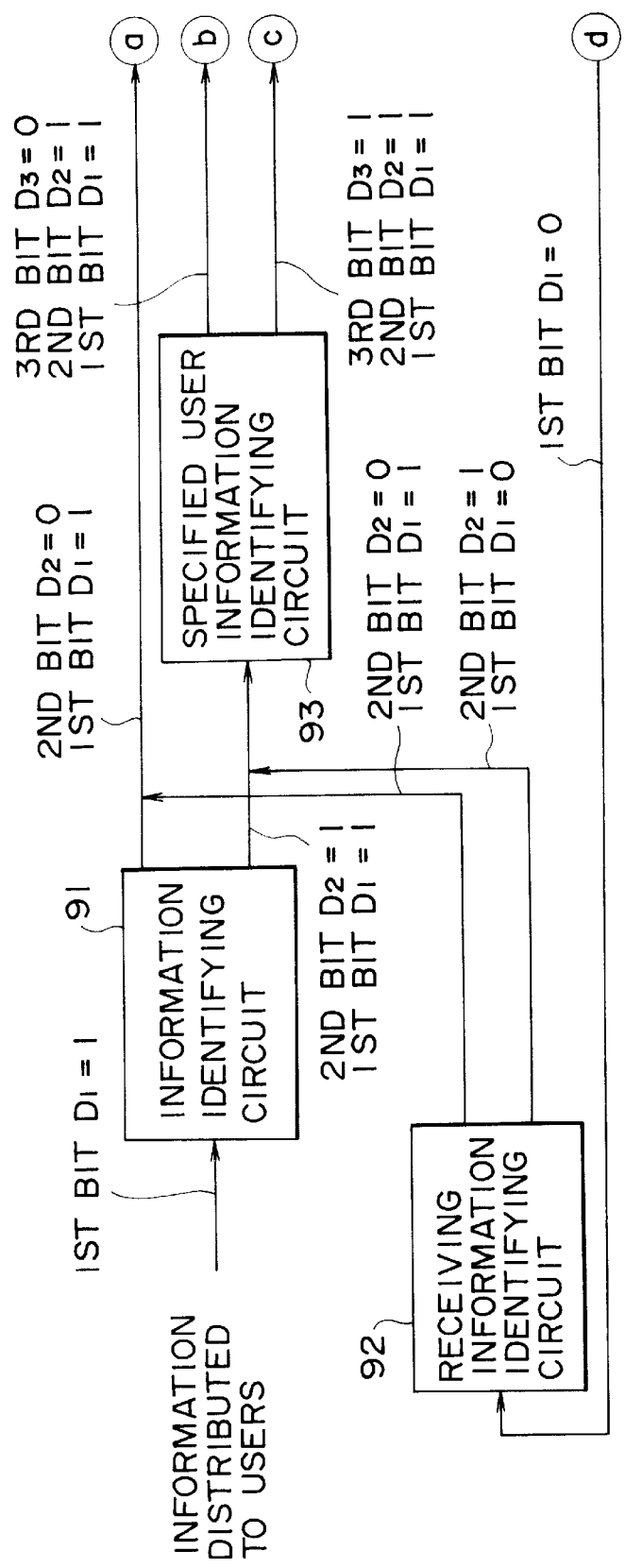

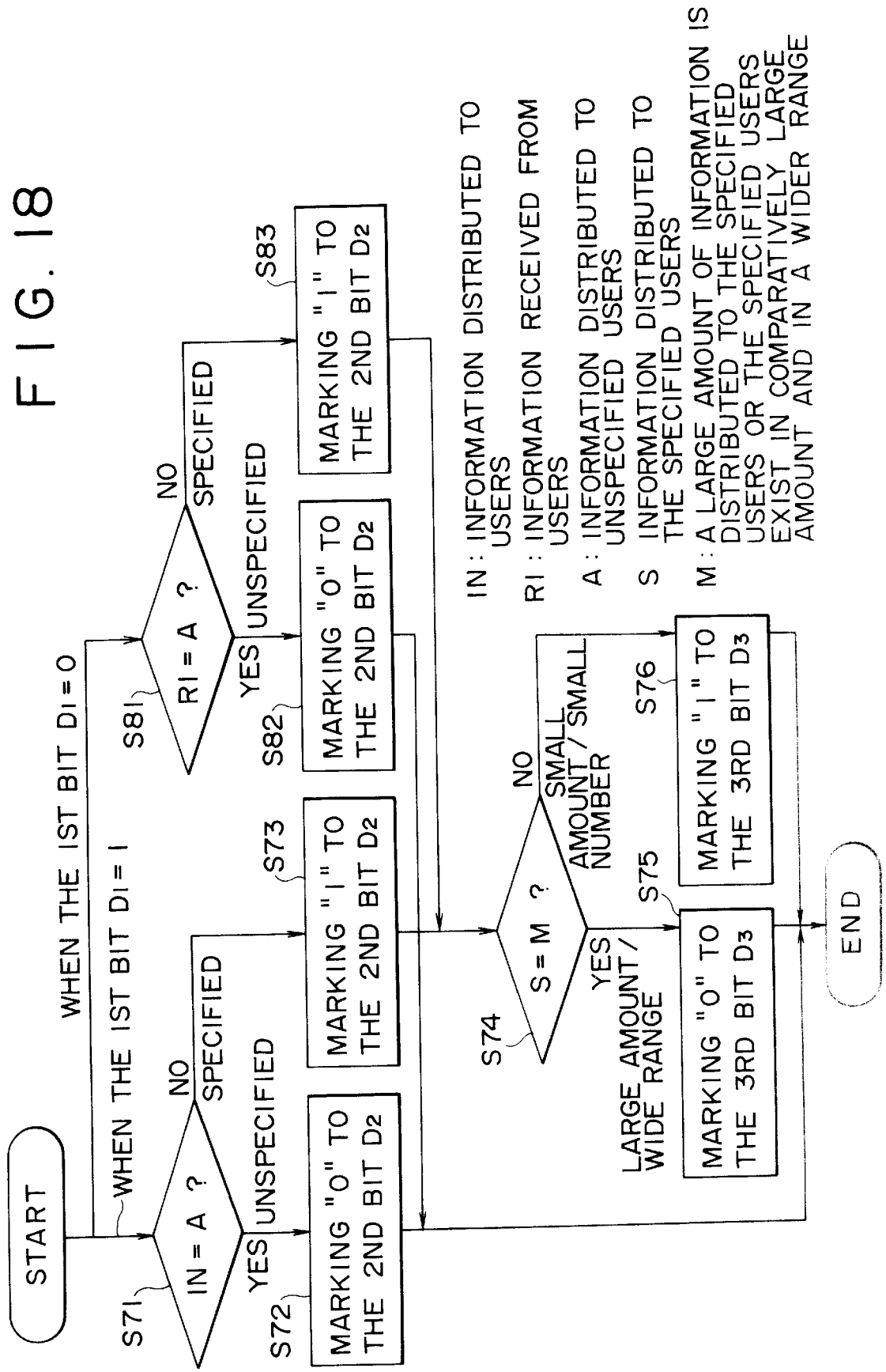

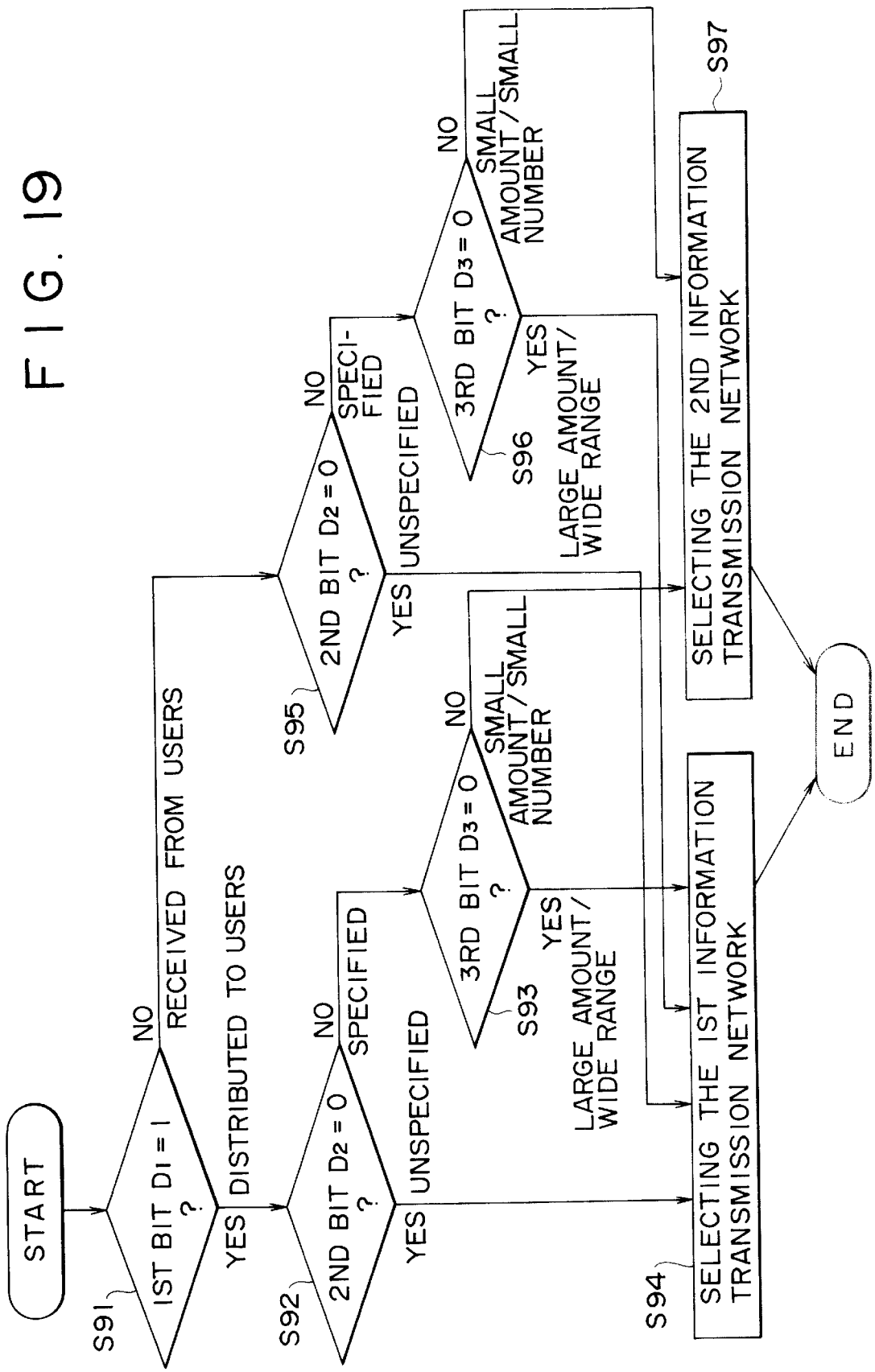

INFORMATION COMMUNICATION SYSTEM AND TRANSMITTING AND TERMINAL APPARATUS FOR THE SAME

BACKGROUND OF THE INVENTION

1. Field of the Invention

The present invention relates to an information communication system and a transmitting apparatus and a terminal apparatus for the same and particularly to an information communication system utilizing a plurality of communication transmission networks and a transmitting apparatus and a terminal apparatus for the same.

2. Description of Related Arts

As a system for offering a variety of information to user apparatuses by connecting an information offering center and user apparatuses via a communication network, a network system, for example, connecting personal computers using a communication line has been proposed. In this network system, a user can obtain a variety of information through a personal computer by making an access to the information offering center from a personal computer used as a user apparatus via the telephone line.

In a certain system, image information can be offered to television receivers installed in households from a broadcast station through a television transmission network in the case of a so-called television broadcast or through a cable in the case of a cable television. According to this system, a tremendous number of pieces of image information can be transmitted to users on the real-time basis.

However, a network explained above utilizing personal computers connected through the telephone network has a problem that it is difficult to transmit a large amount of high quality image information because capacity of the telephone line is limited, that is, capacity of the telephone line is not so high.

The so-called television broadcast system explained above is capable of offering image information to a large number of users but has a problem that it is impossible to gather a variety of information from users.

Moreover, in a cable television (CATV) system, it is possible to obtain information from users at an information offering center, but users have to watch the information offered from the information offering center on the real-time basis, resulting in a problem that users are restricted to have the time to enjoy the information offered.

SUMMARY OF THE INVENTION

It is therefore an object of the present invention to provide an information system which resolves the above-mentioned problems.

It is another object of the present invention to provide a transmitting apparatus which resolves the above-mentioned problems.

It is further object of the present invention to provide a terminal apparatus which resolves the above-mentioned problems.

According to the present invention, there is provided an information communication system including a transmitting apparatus, at least one terminal apparatus and a communication network. The transmitting apparatus transmits information to be offered to users. This transmitting apparatus comprises a selecting circuit and transmits first information and second information therethrough. The terminal apparatus receives the information transmitted from the transmitting apparatus. This terminal apparatus comprises storing means to store the information transmitted. A communication network connects the transmitting apparatus and the terminal apparatus. This communication network comprises a first communication transmission network for transmitting the first information to a terminal apparatus from the transmitting apparatus, a second communication transmission network for transmitting the second information to the terminal apparatus from the transmitting apparatus and a third communication transmission network for transmitting the third information from the transmitting apparatus to a terminal apparatus. The selecting circuit supplies the first information to the first communication transmission network and also supplies the second information to the second communication transmission network.

According to the present invention, there is provided an information communication system including a transmitting apparatus, at least one terminal apparatus and a communication network. The transmitting apparatus transmits information offered to users. This transmitting apparatus also comprises a selecting circuit for identifying the supplied information as first information and second information depending on the distributing information. The terminal apparatus receives the information transmitted from the transmitting apparatus. This terminal apparatus comprises storing means for storing the transmitted information. A communication network connects the transmitting apparatus and the terminal apparatus. The communication network comprises first and second communication transmission networks for transmitting the first information and the second information to the terminal apparatus from the transmitting apparatus and a third communication transmission network for transmitting the third information to the transmitting apparatus from the terminal apparatus. A communication capacity of the first communication transmission network is higher than that of the second communication transmission network. The selecting circuit supplies the first information to the first communication transmission network and also supplies the second information to the second communication transmission network.

According to the present invention, there is provided an information communication system including a transmitting apparatus, at least one terminal apparatus and a communication network. The transmitting apparatus transmits information offered to users. This transmitting apparatus also comprises an adding circuit and a selecting circuit. The adding circuit adds identification information regarding distribution of information to the information supplied. The transmitting apparatus transmits the first and second pieces of information having different kinds of identification information. The terminal apparatus receives the information transmitted from the transmitting apparatus. The terminal apparatus also comprises storing means for storing the transmitted information. A communication network comprises a first communication transmission network for transmitting the first information from the transmitting apparatus to the terminal apparatus, a second communication transmission network for transmitting the second information from the transmitting apparatus to the terminal apparatus and a third communication transmission network for transmitting, from the terminal apparatus, the third information to the transmitting apparatus. The selecting circuit of the transmitting apparatus supplies the first information to the first communication transmission network and the second information to the second communication transmission network depending on the identification information added by the adding circuit.

According to the present invention, there is provided a transmitting apparatus. The transmitting apparatus is connected with at least one terminal apparatus through the communication network including the first, second and third communication transmission networks. This transmitting apparatus also comprises a discriminating circuit and a selecting circuit. The discriminating circuit identifies the information supplied to users as the first and the second pieces of information depending on the identification information indicating distribution of the information. The selecting circuit supplies the first information to the first communication transmission network depending on the result of identification by the discriminating circuit and also supplies selectively the second information to the second communication transmission network.

According to the present invention, there is provided a terminal apparatus. The terminal apparatus is connected with the transmitting apparatus through a communication network including the first, second and third communication transmission network. To the terminal apparatus, the first information transmitted from the transmitting apparatus is supplied through the first communication transmission network, while the second information from the transmitting apparatus through the second communication transmission network. The terminal apparatus comprises storing means and a transmitting circuit. The storing means stores the entire part of the second information transmitted from the transmitting apparatus through at least the second communication transmission network. The transmitting circuit transmits the third information including at least the information to be returned to the transmitting apparatus through the third communication transmission network.

According to the present invention, since the communication transmission network of communication network is selected depending on the information transmitted by the selecting circuit of the transmitting apparatus and it is then stored in the storing means of the terminal apparatus through the selected communication transmission network, deterioration of information by transmission of the information can be prevented.

Moreover, according to the present invention, since the information transmitted through the communication network is stored in the storing means in the terminal apparatus side, a user can read such stored information at the desired timing.

BRIEF DESCRIPTION OF THE DRAWINGS

FIG. 5 illustrates an example of practical structure of a communication network of an information offering system of the present invention.

FIG. 6 is a block diagram showing another example of structure of a communication network of an information offering system of the present invention.

FIG. 7 is a block diagram showing the other example of structure of a communication network of an information offering system of the present invention.

FIG. 8 illustrates a format of information distributed to users.

FIG. 12 is a block diagram showing the other example of structure of a service offering center of FIG. 1.

FIG. 13 is a flowchart for explaining operation of an information identifying circuit and a receiving information identifying circuit of FIG. 12.

FIG. 14 is a diagram illustrating the relationship between FIGS. 14A and 14B. FIGS. 14A and 14B are block diagrams; showing the other example of structure of a service offering center of FIG. 1.

FIG. 16 is a flowchart for explaining operation of an information transmission network selecting circuit of FIG. 14.

FIG. 17 is a diagram illustrating the relationship between FIGS. 17A and 17B. FIGS. 17A and 17B are block diagrams showing the other example of structure of a service offering center of FIG. 1.

FIG. 18 is a flowchart for explaining operation of an information identifying circuit, a receiving information identifying circuit and a specified user information identifying circuit of FIG. 17.

FIG. 19 is a flowchart for explaining operation of an information transmission network of FIG. 17.

DESCRIPTION OF THE PREFERRED EMBODIMENTS

An embodiment of an information communication system of the present invention will be explained hereunder in detail with reference to the accompanying drawings.

Figure 1:
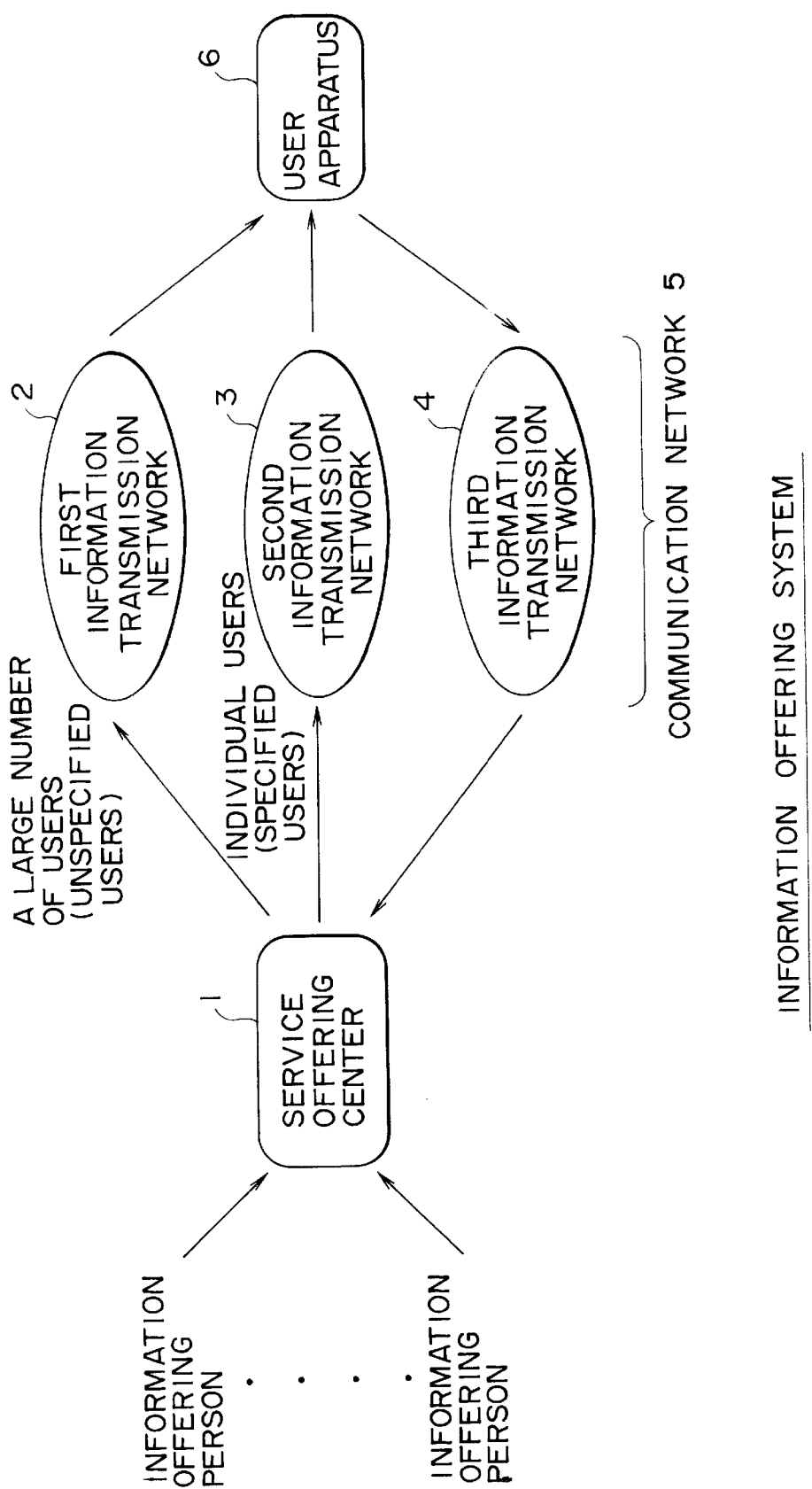
FIG. 1 illustrates an example of structure of an information offering system of the present invention.

FIG. 1 illustrates a basic structure of an embodiment of an information offering system of the present invention. In this embodiment, a service offering center 1 serves as an information generating source and is connected to at least one user apparatus 6 (terminal apparatus) through a communication network 5. Variety pieces of information are offered to a service offering center 1 from a plurality of information offering persons. The service offering center 1 executes necessary edition to the information offered from such information offering persons and then offers such information to a user apparatus 6 through the communication network 5.

The communication network 5 is composed of a first information transmission network 2 and a second information transmission network 3 for transmitting information to the user apparatus 6 from the service offering center 1 and a third information transmission network 4 for transmitting information to the service offering center 1 from the user apparatus 6.

The first information transmitted by the first information transmission network 2 can be defined as the information to be distributed to unspecified users. This first information is suitable for distribution, to a tremendous large number of users represented by newspapers, magazines and books, etc. which are generally called mass-media.

The second information transmitted by the second information transmission network 3 can be defined as information distributed to specified users. The distribution of the second information is restricted to users who require the second information. That is, the second information is distributed only to closed user groups corresponding to requests of the specified users which require the second information.

The third information is transmitted by the third information transmission network 4, and includes means the information for requesting other information required by users from the service offering center 1, information for notifying the service offering center 1 of which information users have watched and information for notifying the service offering center 1 of the accounting information for the information which users have watched.

Figure 2:
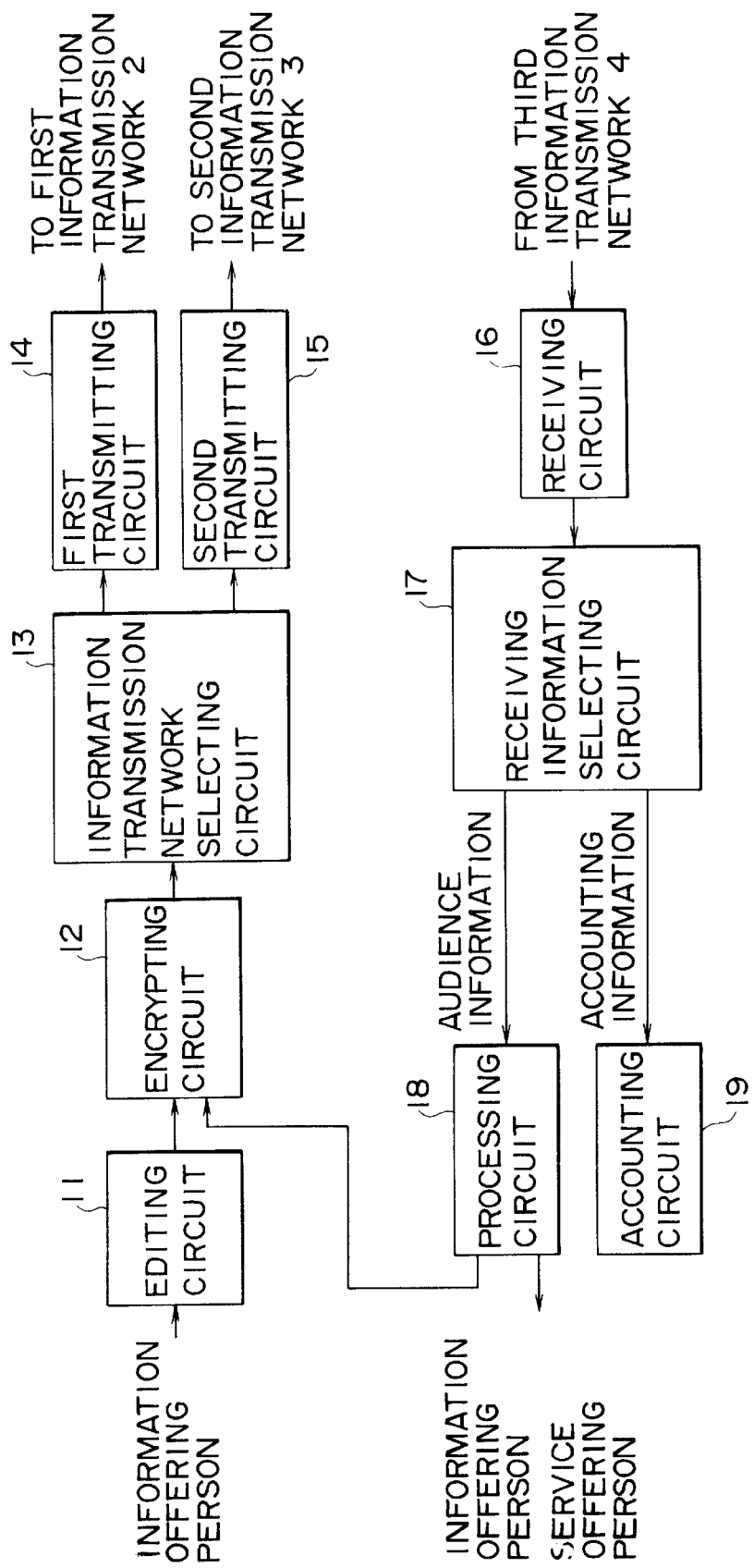
FIG. 2 is a block diagram showing a structure of an embodiment of the service offering center of FIG. 1.

FIG. 2 is a block diagram showing a structure of the service offering center 1. Information supplied from an information offering person is edited as necessary in an editing circuit 11. The editing circuit 11 outputs the information after adding thereto a command so that the information supplied is automatically recorded in the storing means of a user apparatus 6 which will be explained later.

Namely, the service offering center 1 usually transmits the data to a user apparatus 6 at night after it is compressed. In this case, a user of the user apparatus 6 is often asleep. Therefore, the command added in the editing circuit 11 automatically turns ON the power supply of the user apparatus 6 when it is turned OFF and also automatically stores the information transmitted from the service offering center 1 into the storing means 33. A user can therefore reproduce and use the information stored in the storing means 33 in the desired timing such as in the morning or daytime.

The editing circuit 11 also adds an ID for identifying a user to the information to be offered to the specified users.

The information outputted from the editing circuit 11 is then supplied to an encrypting circuit 12 and encrypted therein as required. The encrypted information is supplied to an information transmission network selecting circuit 13 in order to identify the information whether it is the first information to be transmitted through the first information transmission network 2 or the second information to be transmitted through the second information transmission network 3. The information transmission network selecting circuit 13 outputs the first information to a first transmitting circuit 14 and also outputs the second information to a second transmitting circuit 15. The first transmitting circuit 14 and the second transmitting circuit 15 modulate the inputted first and second pieces of information with the system corresponding to the transmission characteristics of the respective first information transmission network 2 and the second information transmission network 3 and then output these pieces of information to the first information transmission network 2 or the second information transmission network 3.

Meanwhile, the third information transmitted from the user apparatus 6 through the third information transmission network 4 is received by a receiving circuit 16 and is then demodulated. This third information is supplied to a receiving information selecting circuit 17 and is then selected depending on its contents. For instance, the accounting information apparatus 6 is supplied to an accounting circuit 19. The accounting circuit 19 executes the accounting process depending on the information used by the user apparatus 6 and application time thereof according to the input accounting information.

On the other hand, the information other than the accounting information, for example, an audience rating of each user information and purchasing information generated in the shopping information is supplied to a processing circuit 18. The processing circuit 18 executes the signal processing as required of this information and then feeds back such information to each user apparatus 6 through the encrypting circuit 12 and information transmission network selecting circuit 13. Each user can detect such statistic information as which information is now popular or which item is now purchased, depending on the feedback information.

The information supplied to the processing circuit 18 is then supplied in direct without any processing or after processing by the processing circuit 18 as required to the information offering person or service offering person. When an item purchasing information is included in this information, an information offering person or service offering person executes the procedures for offering such item to users corresponding to such information.

Figure 3:
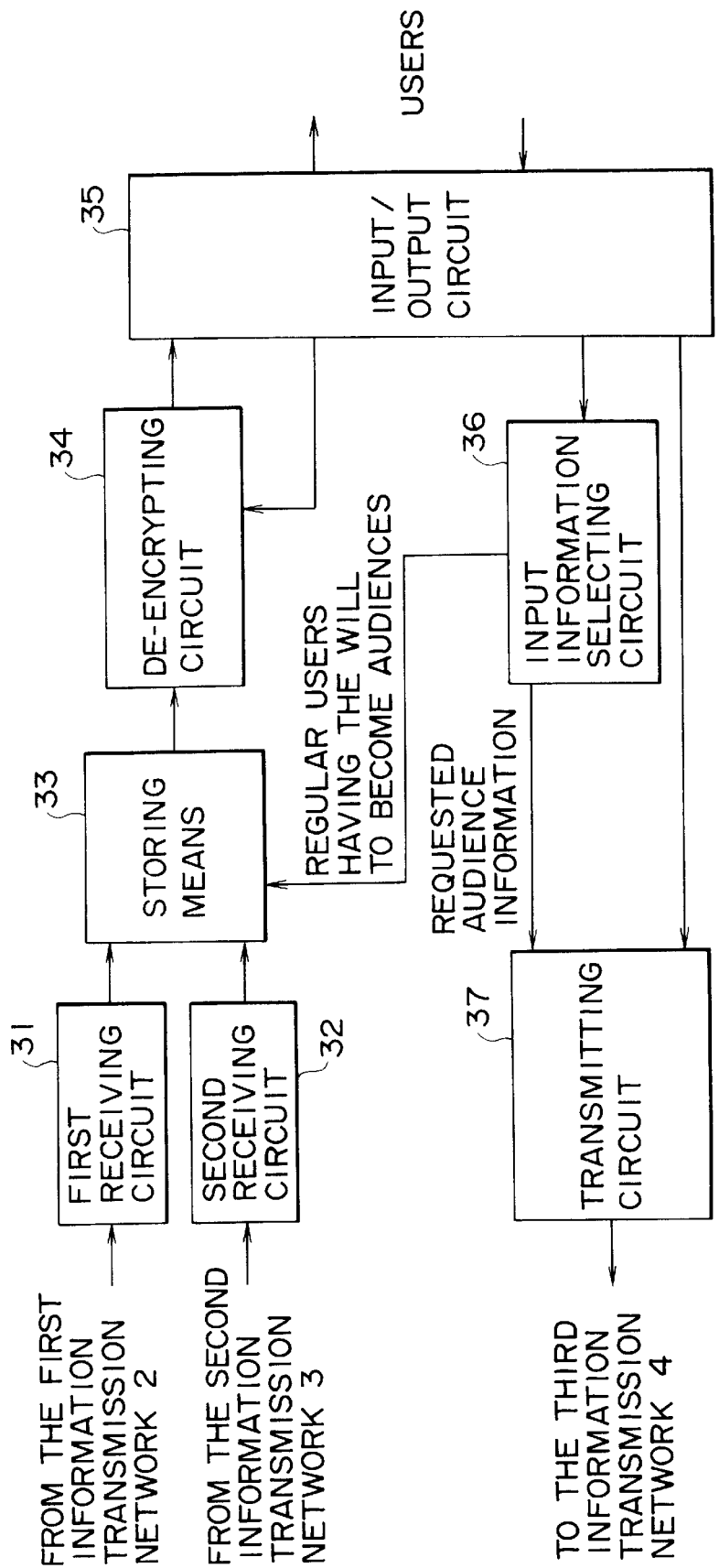
FIG. 3 is a block diagram showing an example of structure of a user apparatus of FIG. 1.

FIG. 3 is a block diagram showing a structure of a user apparatus. A first receiving circuit 31 and a second receiving circuit 32 respectively receive a first information and a second information supplied from the first information transmission network 2 or the second information transmission network 3 and then demodulate such information. As is explained above, a command for automatically turning ON the power supply of the user apparatus 6 when the power supply thereof is turned OFF and recording the received first and second pieces of information into the storing means 33 is included in the first and/or second information. Therefore, when the power supply of the user apparatus 6 is turned OFF, the power supply is automatically turned ON and the first information and/or second information is automatically recorded in the storing means 33. This storing means 33 is formed of a storage device using semiconductor memory or a recording and/or reproducing device using a disc type recording medium or a recording tape medium.

The second information received by the second receiving circuit 32 is transmitted to the specified users and includes a comparatively small amount of data. This second information is used for a comparatively small amount of specified users. Therefore, the information received by the second receiving circuit 32 includes information for identifying a user to receive this information, for example, an ID information such as an ID code. This information for identifying a user to receive this information is added in the editing circuit 11. Therefore, the second information received by the second receiving circuit 32 is stored or recorded in the storing means 33 of the user apparatus 6 of users designated by the information for identifying the users to receive the information.

The information for identifying a user may be formed, for example, of an ID code. In this case, only the user apparatus 6 having such ID code can store or record the second information into the storing means 33.

Meanwhile, when the second information transmission network 3 is structured, for example, by a telephone line, the service offering center 1 executes call origination to the specified user apparatuses 6 in order to transmit the second information. Therefore, in this case, the called user apparatuses 6 record or store the second information into the storing means 33 as the specified user apparatuses 6.

The first information received by the first receiving circuit 31 can be classified into two kinds of information. One is the information to be transmitted to the specified users which cannot be easily transmitted by the second information transmission network because it has a large amount of data, or the information also to be transmitted to the specified users but is not suitable for transmission through the second information transmission network 3 because users are distributed in wider range. In any case, since the information transmitted through the first information transmission network 2 includes the information identifying the information to be distributed to the specified users, the first information is recorded or stored only in the storing means 33 of the user apparatus 6 of the users as the receiving object corresponding to the information for identifying the users to receive but is not recorded in the storing means 33 of the user apparatus 6 of the other users because the information for identifying the users to receive is not matched.

The other first information is the information to be transmitted to unspecified users. In this case, the first information is recorded or stored in the storing means 33 of user apparatuses 6 of all users.

However, in the case when a user has contracted with the service offering center 1 to accept, for example, only the predetermined kind of information, for instance, the political information, the storing means 33 extracts the information indicating a kind of information, that is, the political information from the received information. When the information of the kind contracted can be extracted, this information is stored or recorded in the storing means 33 and when the information of the other kinds is extracted, the transmitted information is not stored or recorded in the storing means 33.

As explained above, only the necessary information is recorded into the storing means 33 and therefore excessively large amount of information is never recorded into the storing means 33 and recording capacity of the storing means 33 is protected from ineffective use. Therefore, only the information which is intrinsically required by users is recorded in this storing means 33 and the control data required for transmission are never recorded therein.

A user instructs reproduction of the predetermined information among those recorded in the storing means 33 in the predetermined timing through an input/output circuit 35. This instruction is then inputted to an input information selecting circuit 36 through the input/output circuit 35. The input information selecting circuit 36 reads a user ID from the input information and discriminates whether the user ID is the regular user ID. When instruction for reproduction from a regular user is discriminated, the storing means 33 is controlled to reproduce the information designated by input from user among the information recorded or stored in the storing means 33.

The information reproduced from the storing means 33 is then supplied to a de-encrypting circuit 34 for de-encryption and is thereafter outputted through an input/output circuit 35 and displayed, for example, on a CRT not illustrated. Thereby, a user can use or watch the information offered from the service offering center 1 at the desired time.

When a signal to request the offering of the predetermined information to the service offering center 1, audience information generated after watching of the predetermined information or accounting information is inputted from the input/output circuit 35, an input information selecting circuit 36 outputs these pieces of information to the transmitting circuit 37. The transmitting circuit 37 modulates these signals by the system corresponding to the transmission characteristic of the third information transmission network 4 and then outputs the modulated signal to the third information transmission network 4.

Figure 4:
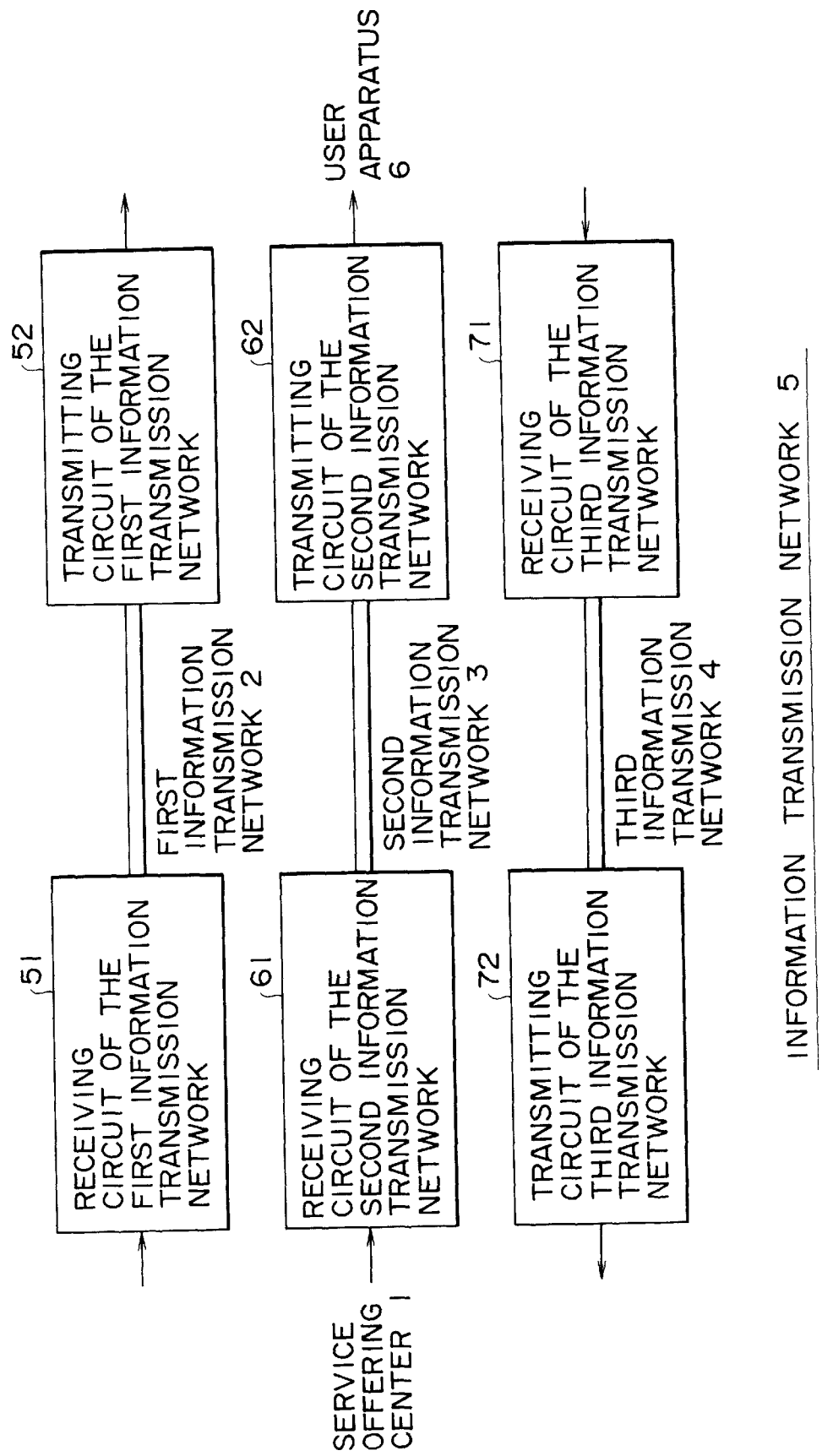
FIG. 4 is a block diagram showing an example of structure of an information transmission network of FIG. 1.

FIG. 4 schematically illustrates a structure of an information transmission network 5. As shown in FIG. 4, a first information transmission network 2 comprises a receiving circuit 51 of the first information transmission network for receiving the first information from the service offering center 1. This receiving circuit 51 of the first information transmission network supplies the inputted first information to the transmitting circuit 52 of the first information transmission network through the first information transmission network 2. The transmitting circuit 52 of the first information transmission network supplies the first information supplied from the receiving circuit 51 of the first information transmission network to the user apparatus 6.

In the same manner, the second information supplied from the service offering center 1 is received by the receiving circuit 61 of the second information transmission network and is then supplied to the transmitting circuit 62 of the second information transmission network through the second information transmission network 3. The transmitting circuit 62 of the second information transmission network transmits the second information to the user apparatus 6.

The receiving circuit 71 of the third information transmission network receives the third information from the user apparatus 6 and then outputs this information to the transmitting circuit 72 of the third information transmission network through the third information transmission network 4. The transmitting circuit 72 of the third information transmission network supplies the third information to the service offering center 1.

FIG. 5 illustrates an example of practical structures of the first information transmission network 2 to third information transmission network 4. In the embodiment shown in FIG. 5, the first information transmission network 2 is composed of an information transmission network utilizing a broadcasting satellite or a communication satellite 81 and both second information transmission network 3 and third information transmission network 4 are composed of a public telephone network 82. As explained above, the first information means the information offered to unspecified users or the information, although offered to the specified users, including a large amount of data. Therefore, such information deteriorates its quality when it is transmitted through the public telephone network 82. For this reason, the first information is transmitted through the information transmission network utilizing a broadcasting satellite 81 having a higher accommodation capacity.

Meanwhile, the second information is transmitted to the specified users and distributed to the small number of users including small amount of data. Therefore, the second information is transmitted through the public telephone network 82 having a comparatively lower accommodation capacity. Since this information is small in amount, it can be transmitted using a longer time and thereby deterioration of quality of the information can be prevented. The third information from apparatus 6 is, data information of extremely small amount including audience information and accounting information. Therefore, the third information can be transmitted through the public telephone network 82.

The predetermined one among those from the first information transmission network 2 to the third information transmission network 4 can further be formed of a plurality of information transmission networks. FIG. 6 illustrates an embodiment using a plurality of information transmission networks. In this embodiment, the first information transmission network 2 and the third information transmission network 4 are respectively composed, as in the case of the embodiment shown in FIG. 5, of the information transmission network using a broadcasting satellite 81 and the public telephone network 82. However the second information transmission network 3 is composed of a couple of information transmission networks. One is an information transmission network using a broadcasting satellite 81 and another is a public telephone network 82.

The predetermined one of the first information transmission network 2 to the third information transmission network 4 may be partly composed of different information transmission networks. FIG. 7 illustrates an embodiment where different information transmission networks are partly used. In the embodiment shown in FIG. 7, the second information transmission network 3 and the third information transmission network 4 are composed of the public telephone network 82 as in the case of FIG. 5, however the first information transmission network 2 is composed of an information transmission network using a broadcasting satellite 81 and an information transmission network using a cable 86.

Namely, the first information outputted from the service offering center 1 is once transmitted to a CATV center 85 through the broadcasting satellite 81 and is then transmitted to the user apparatus 6 from the CATV center 85 through the cable 86.

As the first information transmission network 2, a ground wave broadcast network using FM or UHF signal or an information transmission network using CATV may be used as well as an information transmission network using a broadcasting satellite or communication satellite 81. The information transmission network using CATV includes the network forming a system through a coaxial cable or the network using an optical fiber.

As the second information transmission network 3, the information transmission networks using a communication satellite, broadcasting satellite, ground wave broadcast and CATV as well as the public communication networks such as a public telephone network, ISDN (Integrated Services Digital Network), and B-ISDN can also be used by adding an identifier for identifying the specified users.

As the third information transmission network 4, CATV can be used as well as the public communication networks such as a public telephone network, ISDN and B-ISDN.

Combination of these transmission networks can be summarized as shown in Table 1.

TABLE 1

| 1st ITN | 2nd ITN | 3rd ITN |
| --- | --- | --- |
| Satellite | PCN | PCN |
| Satellite | Satellite | PCN |
| Satellite | GWB | PCN |
| Satellite | CATV | PCN |
| Satellite | PCN | CATV |
| Satellite | Satellite | CATV |
| Satellite | GWB | CATV |
| Satellite | CATV | CATV |
| GWB | PCN | PCN |
| GWB | Satellite | PCN |
| GWB | GWB | PCN |
| GWB | CATV | PCN |
| GWB | PCN | CATV |
| GWB | Satellite | CATV |
| GWB | GWB | CATV |
| GWB | CATV | CATV |
| CATV | PCN | PCN |
| CATV | Satellite | PCN |
| CATV | GWB | PCN |
| CATV | CATV | PCN |
| CATV | PCN | CATV |

TABLE 1-continued

| 1st ITN | 2nd ITN | 3rd ITN |
| --- | --- | --- |
| CATV | Satellite | CATV |
| CATV | GWB | CATV |
| CATV | CATV | CATV |

ITN: Information Transmission Network
PCN: Public Communication Network
GWB: Ground Wave Broadcast FIG. 8 illustrates an example of the format of information to be transmitted to the user apparatus 6. In this embodiment, the identification codes $D_1$, $D_2$, $D_3$ of three bits are added to the leading end of one unit consisting of N bits of the information to be transmitted and these identification codes are followed by the data regarding the the information which should naturally be transmitted, that is, the information distributed to users or the information received from users in the bits from $D_4$ to $D_N$.

The first bit $D_1$ among the identification codes is 1 for the information to be distributed to users or 0 for the information received from users.

The second bit $D_2$ is 1 when the information distributed to users or the information received from users is the information to be distributed to the specified users or 0 when such information is to be distributed to unspecified users.

The third bit $D_3$ is 0 when the information distributed to users or the information received from users is to be distributed to the specified users in large amount or to a large number of specified users located in a wider area or 1 when a small amount of information is distributed to users or when the information is distributed to a small number of specified users.

Figure 9:
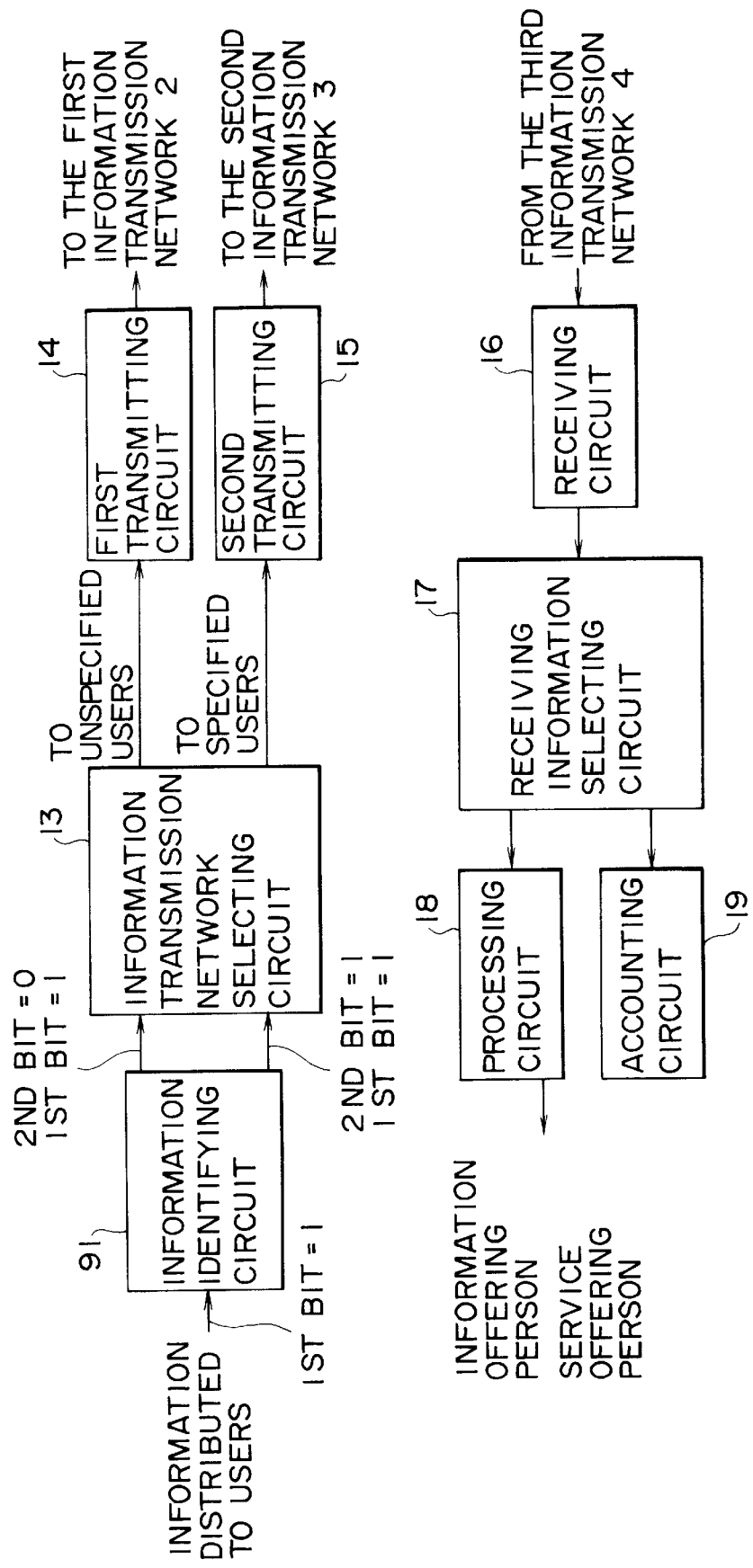
FIG. 9 is a block diagram showing the other example of structure of a service offering center of FIG. 1.

In the case of transmitting information to each user apparatus 6 depending on the format shown in FIG. 8, the service offering center 1 is constituted, for example, as shown in FIG. 9. That is, in the embodiment shown in FIG. 9, an information identifying circuit 91 is provided in the service offering center 1. The information distributed to users which is outputted from the editing circuit 11 shown in FIG. 2 is supplied to the information identifying circuit 91. The editing circuit 11 sets the first bit $D_1$ of the identification code shown in FIG. 8 to 1 at the time of outputting information. The value 1 indicates that the information is to be distributed to users.

Figure 10:
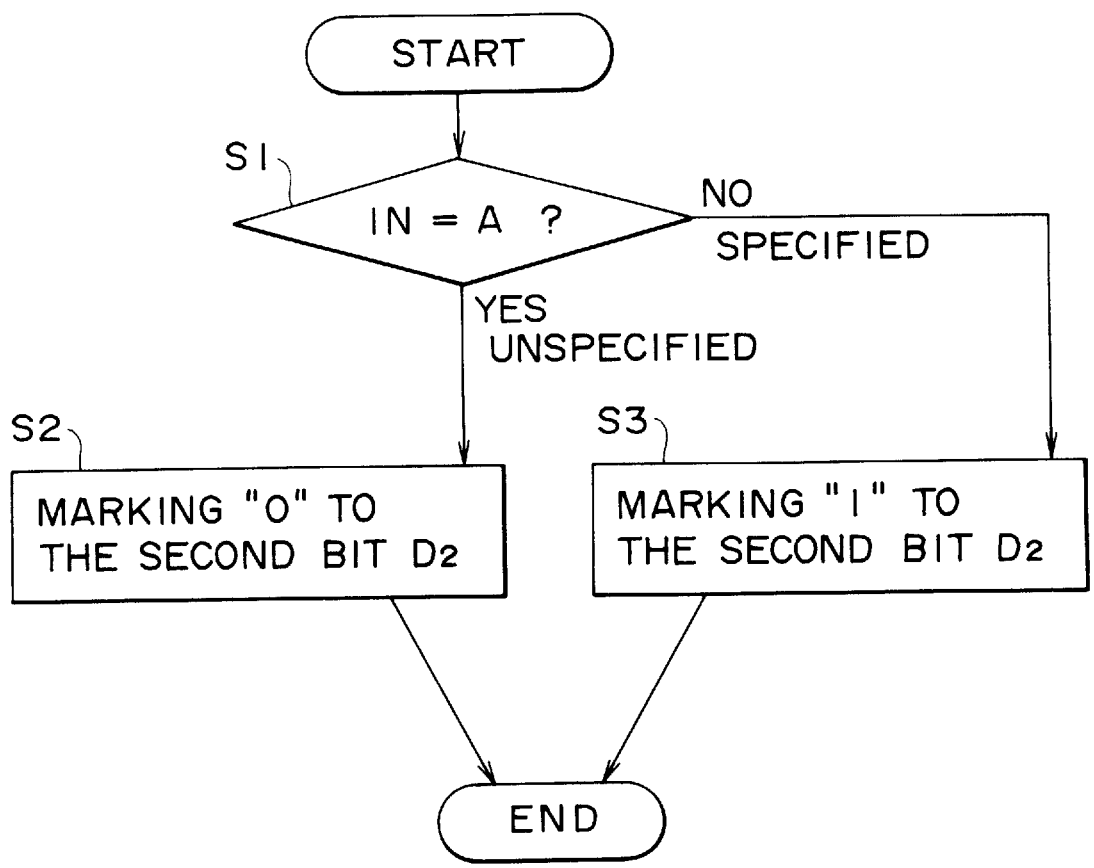
FIG. 10 is a flowchart for explaining operation of an information identifying circuit of FIG. 9.

The information identifying circuit 91 executes the processes shown in the flowchart of FIG. 10. Namely, first, in the step S1, it is determined whether the first bit $D_1$ of the identification code of the input information to be distributed to users is 1 to determine whether the information is to be distributed to the specified users or unspecified users based on the result of determination. When the information is determined to be the information to be distributed to unspecified users, the processing skips to the step S2. In the step S2, 0 is set to the second bit of the identification code. When the information is determined to be the information to be distributed to the specified users, the processing skips to the step S3 to set the second bit $D_2$ of the identification code to 1.

Figure 11:
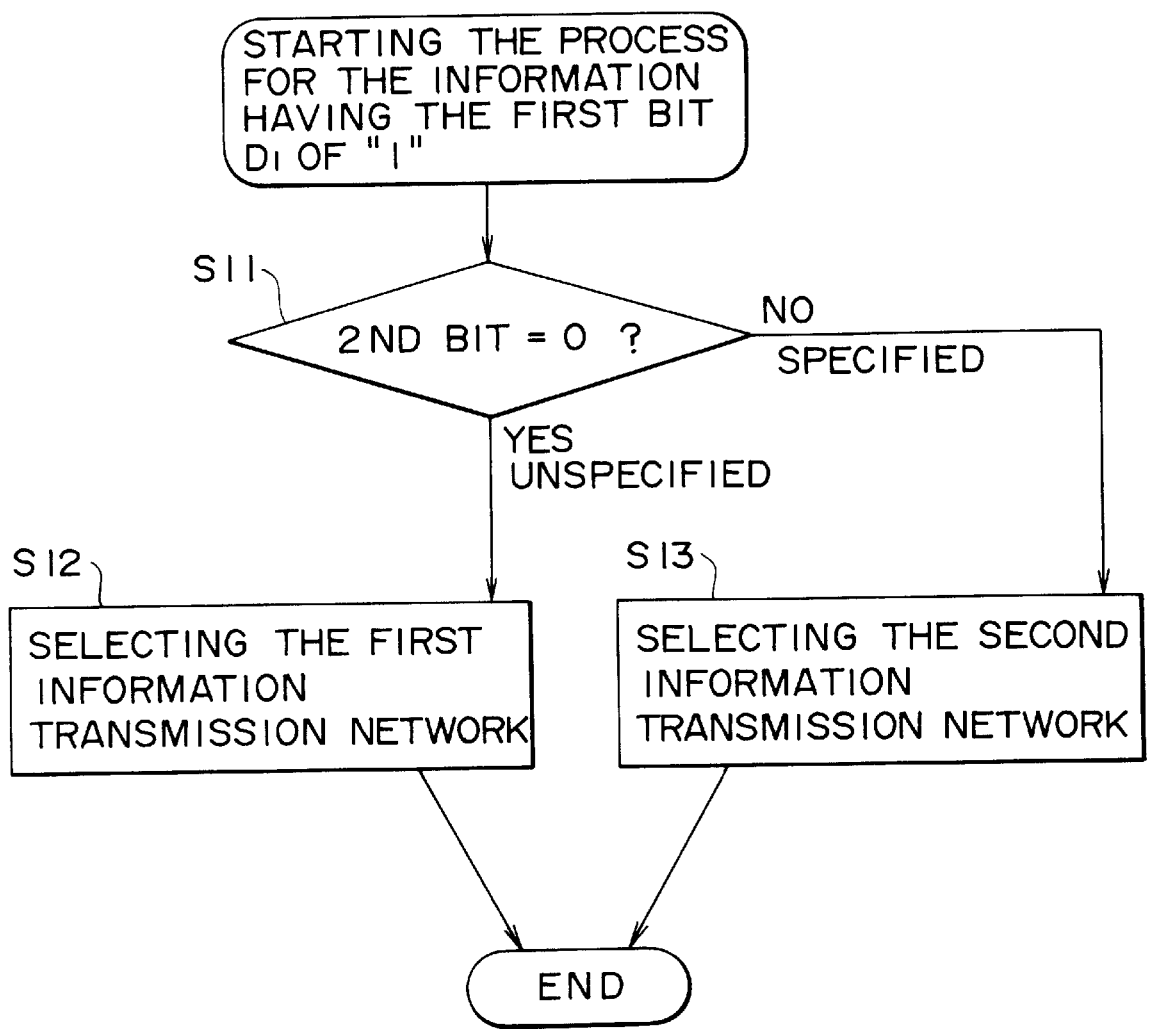
FIG. 11 is a flowchart for explaining operation of an information transmission network selecting circuit of FIG. 9.

As explained, the information where 1 is set to the first bit $D_1$ and 1 or 0 is set to the second bit $D_2$ is supplied to the information transmission network selecting circuit 13. This information transmission network selecting circuit 13 executes the processes indicated in the flowchart of FIG. 11. Namely, first, in the step S11, it is determined whether the second bit $D_2$ of the identification code of the inputted information is 0, that is, whether the information is to be distributed to unspecified users. When the second bit $D_2$ is 0, it means that the inputted information is to be distributed to the specified users. Therefore, the processing skips to the step S12 in order to transmit such information to the first transmitting circuit 14. Meanwhile, when the second bit $D_2$ is not 0, namely when the second bit $D_2$ is 1, it means that the inputted information is to be distributed to the specified users, the processing skips to the step S13 in order to supply this information to the second transmitting circuit 15.

The processing operations of the other portions of the embodiment shown in FIG. 9 are the same as those of the structure shown in FIG. 2. The detail explanation about such processing operations will be omitted here.

FIG. 12 illustrates another example of structure of the service offering center 1. In the embodiment shown in FIG. 12, a receiving information identifying circuit 92 is provided between the processing circuit 18 and information transmission network selecting circuit 13, in addition to the information identifying circuit 91 shown in FIG. 9. The other structure is the same as that shown in FIG. 9.

In this embodiment shown in FIG. 12, the editing circuit 11 shown in FIG. 2 sets the first bit $D_1$ of the identification code of the information distributed to users to be supplied to the information identifying circuit 91 to 1, while the first bit $D_1$ of the identification code of the information to be outputted to the information transmission network selecting circuit 13 shown in FIG. 12 from the processing circuit 18 is set to 0 in order to indicate that the information is received from users.

The information identifying circuit 91 and the receiving information identifying circuit 92 execute the processes indicated in the flowchart of FIG. 13.

The information identifying circuit 91 executes the processes indicated in the steps S21 to S23 for the information to be distributed to users where the first bit $D_1$ of the identification code is 1. The processes indicated in the steps S21 to S23 are substantially the same as those indicated in the steps S1 to S3 shown in FIG.10 (processes in the information identifying circuit 91 shown in FIG. 9) and therefore the explanation made above can also be applied to the processes in the steps S1 to S3.

Meanwhile, the receiving information identifying circuit 92 executes the processes in the steps S31 to S33 for the information where the first bit $D_1$ of the identification code is 0, namely for the information received from users. That is, first, in the step S31, it is determined whether the information supplied from the processing circuit 18 is to be distributed to unspecified users. When the information is determined to be the information to be distributed to unspecified users, the processing skips to the step S32 and 0 is designated in the second bit $D_2$ of the identification code. When the information is determined to be the information to be distributed to the specified users, the processing skips to the step S33 and 1 is designated in the second bit $D_2$ of the identification code.

That is, the processes in the steps S31 to S33 are basically the same as those in the steps S21 to S23, that is, the steps S1 to S3 shown in FIG. 10.

In the embodiment shown in FIG. 12, information is inputted to the information transmission network selecting circuit 13 as explained above from both information identifying circuit 91 and receiving information identifying circuit 92. The information transmission network selecting circuit 13 executes the processes the same as those shown in FIG. 11, even when the first bit $D_1$ of the identification code of the input information is 1, as well as the case where the first bit $D_1$ is 0. That is, it is determined whether the second bit $D_2$ is 0 and when the second bit $D_2$ is 0, it means the information is to be distributed to unspecified users. Therefore, the input information is supplied to the first transmitting circuit 14.

On the other hand, when the second bit $D_2$ is not 0, that is, when the second bit $D_2$ is 1, it means that the input information is to be distributed to the specified users. Therefore, the input information is supplied to the second transmitting circuit 15.

FIG. 14 illustrates the other example of structure of the service offering center 1. In the embodiment of FIG. 14, information to be distributed to unspecified users is supplied in direct to the information transmission network selecting circuit 13 by the information identifying circuit 91, but information to be distributed to the specified users is supplied to the information transmission network selecting circuit 13 through the specified user information identifying circuit 93. The other structure is the same as that of the embodiment shown in FIG. 9 and therefore the explanation made above can also be applied as the detail explanation about such structure.

Figure 15:
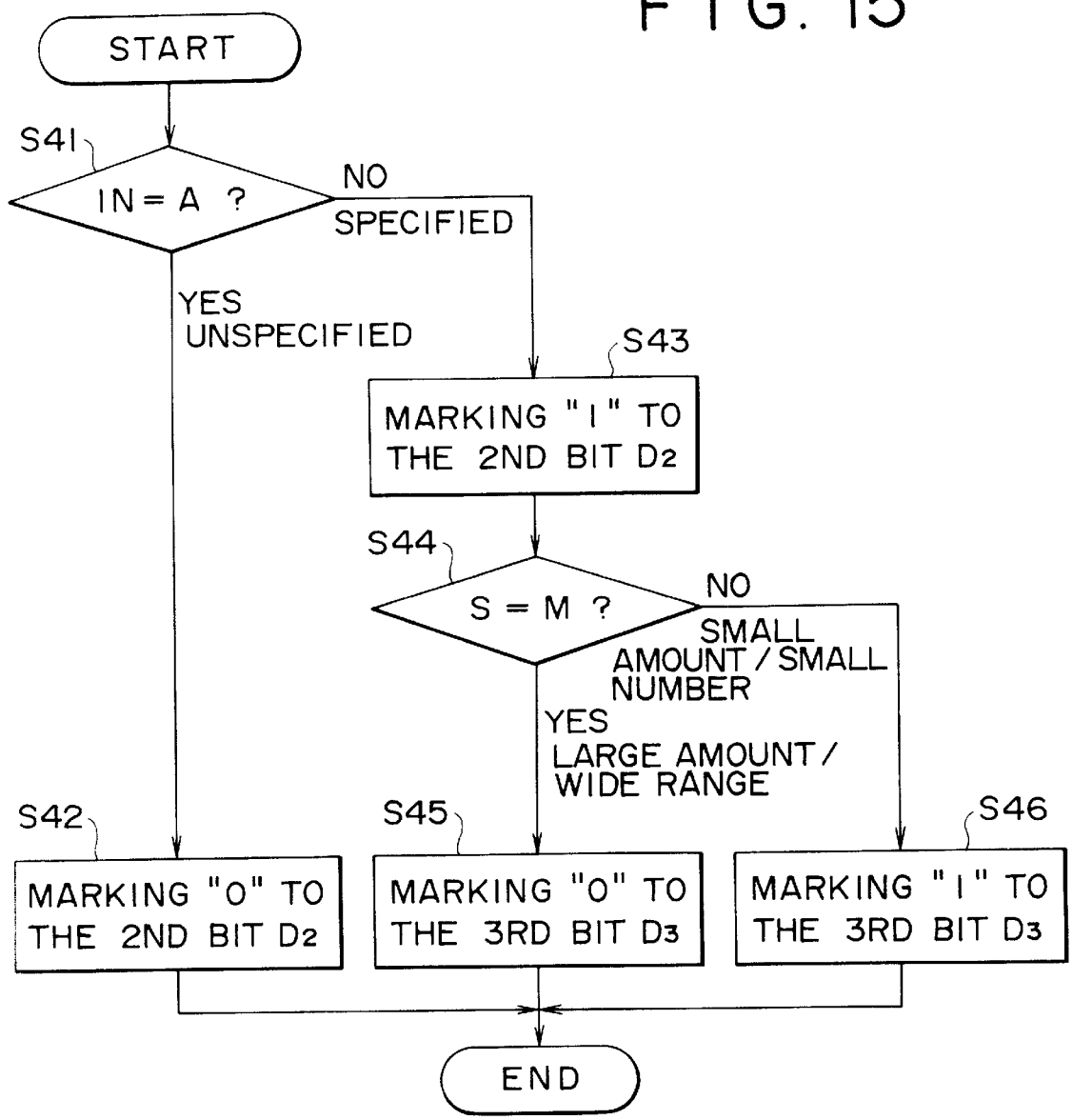
FIG. 15 is a flowchart for explaining operation of an information identifying circuit and a specified user information identifying circuit of FIG. 14.

In the embodiment shown in FIG. 14, both information identifying circuit 91 and specified user information identifying circuit 93 execute the processes indicated in the flowchart of FIG. 15. The information identifying circuit 91 determines, in the step S41, whether the input information to be distributed to users is the information to be distributed to unspecified users. When the information is determined to be the information to be distributed to unspecified users, the processing skips to the step S42 to set the second bit $D_2$ of the identification code of the information to 0. The input information is supplied to the information transmission network selecting circuit 13.

Meanwhile, when the input information is determined to be the information to be distributed to the specified users, the processing skips to the step S43 to set the second bit $D_2$ of the identification code to 1 and supply the information to the specified user information identifying circuit 93.

In step S44, the specified user information identifying circuit 93 determines whether the information which is supplied from the information identifying circuit 91 and then distributed to the specified users, that is, the information where the second bit $D_2$ is 1 is a large amount of information or the information to be distributed to a comparatively large number of the specified users distributed in a wider range. When the input information is a large amount of information or to be distributed to a comparatively large number of the specified users distributed in a wider range, the processing skips to the step S45 to set the third bit $D_3$ of the identification code of the input information to 0 and to supply the input information to the information transmission network selecting circuit 13.

Meanwhile, when the input information is a small amount of information or to be distributed to a comparatively small number of the specified users, the processing skips to the step S46 to set the third bit $D_3$ of the identification code of the input information to 1 and to supply the input information to the information transmission network selecting circuit 13.

The information transmission network selecting circuit 13 executes the processes in the flowchart of FIG. 16 for the information supplied from the information identifying circuit 91 or the specified user information identifying circuit 93.

Namely, first, in the step S51, it is determined whether the second bit $D_2$ of the identification code of the input information is 0, namely whether the input information is to be distributed to unspecified users. When the second bit $D_2$ is 0, it means that the information is to be distributed to unspecified users. Therefore, the processing skips to the step S52 to supply the input information to the first transmitting circuit 14.

On the other hand, when the second bit $D_2$ of the identification code of the input information is not 0, that is, the second bit $D_2$ is 1, it means that the input information is to be distributed to the specified users. Therefore, the processing skips to the step S53 to determine whether the third bit $D_3$ of the identification code of the input information is 0. When the third bit $D_3$ is 0, it means that the input information is a large amount of information or the input information is to be distributed to a comparatively large number of the specified users distributed in a wider range. Therefore, the processing skips to the step S52 to supply the input information to the first transmitting circuit 14.

Meanwhile, when the third bit $D_3$ is not 0 (that is, the bit is 1), it means that the input information is a comparatively small amount of information or the information to be distributed to a comparatively small number of the specified users. Therefore, the processing skips to the step S54 to output the input information to the second transmitting circuit 15.

Figure 17B:
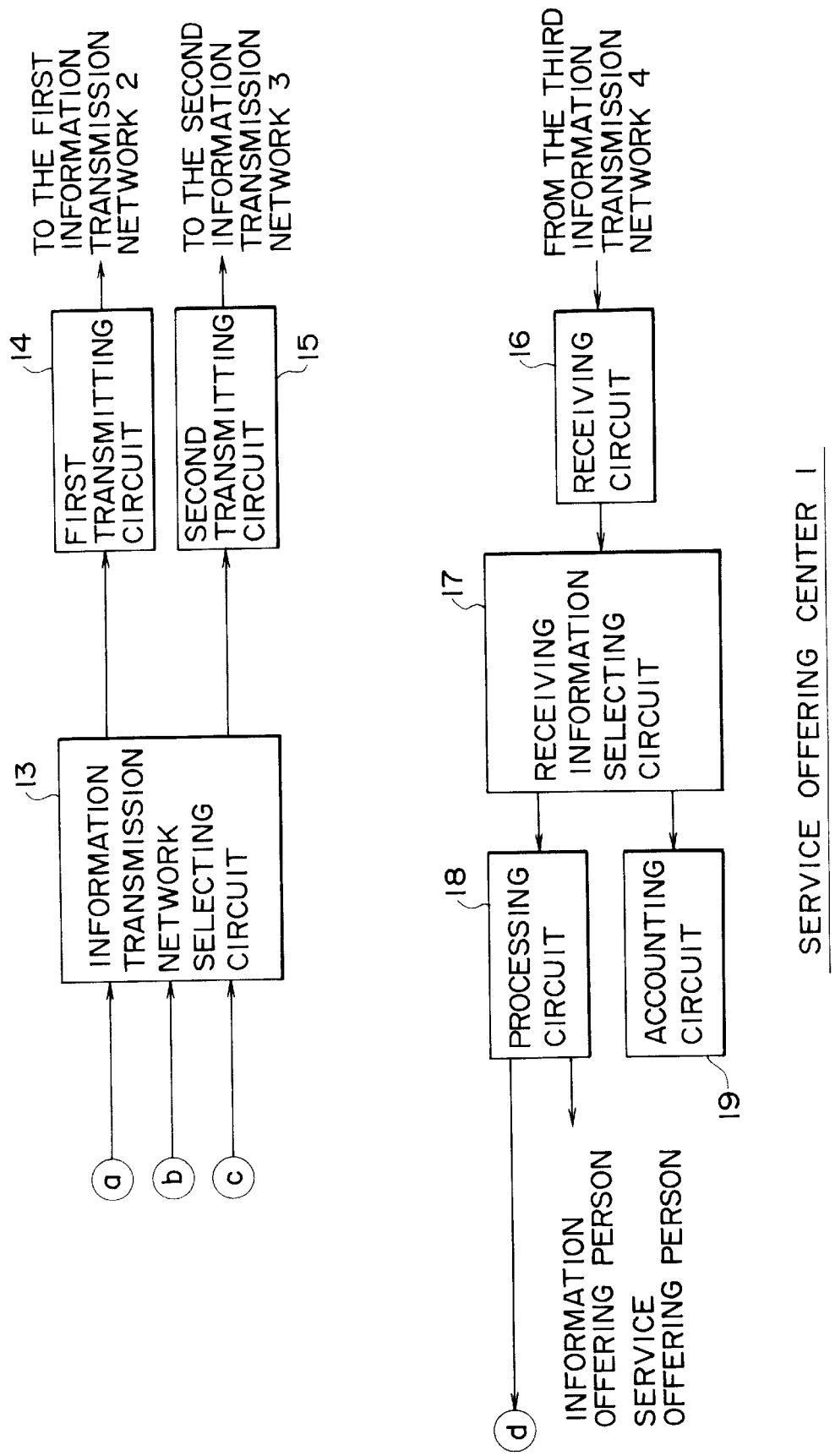

FIG. 17 illustrates the other example of structure of the service offering center 1. In the embodiment of FIG. 17, the information identifying circuit 91 shown in FIG. 9, the receiving information identifying circuit 92 shown in FIG. 12 and the specified user information identifying circuit 93 shown in FIG. 14 are all provided. In the case of the embodiment shown in FIG. 17, the processes indicated in the flowchart of FIG. 18 are executed by the information identifying circuit 91, receiving information identifying circuit 92 and specified user information identifying circuit 93.

That is, when the information distributed to users, or the information where 1 is designated to the first bit $D_1$ of the identification code is inputted, the information identifying circuit 91 determines, in the step S71, whether the input information is to be distributed to unspecified users. When the information is determined to be the information to be distributed to unspecified users, the processing skips to the step S72 to set the second bit $D_2$ of the identification code to 0 to supply the input information to the information transmission network selecting circuit 13.

Meanwhile, when the input information is to be distributed to the specified users, the processing skips to the step S73 to set the second bit $D_2$ of the identification code to 1 to supply the input information to the specified user information identifying circuit 93.

On the other hand, the receiving information identifying circuit 92 determines whether the information is to be distributed to unspecified users in the step S81 for the information received from users and supplied from the processing circuit 18, that is, the information where the first bit $D_1$ of the identification code is 0. When the input information is to be distributed to unspecified users, the processing skips to the step S82 to set the second bit $D_2$ of the identification code to 0 to supply the input information to the information transmission network selecting circuit 13.

Meanwhile, when the input information is to be distributed to the specified users, the processing skips to the step S83 to set the second bit $D_2$ of the identification code to 1 to supply the input information to the specified user information identifying circuit 93.

In the step S74, the specified user information identifying circuit 93 determines whether the information to be distributed to the specified users, that is, the information where the second bit $D_2$ of the identification code is 1 supplied from the information identifying circuit 91 is a large amount of information or the information to be distributed to the large number of the specified users distributed in a wider range. When the information is determined, in the step S74, to be a large amount of information or the information to be distributed to a comparatively large number of the specified users distributed in a wider range, the processing skips to the step S75 to set the third bit $D_3$ of the identification code to 0 to supply the input information to the information transmission network selecting circuit 13.

On the other hand, when the input information is determined, in the step S74, to be a small amount of information or as the information to be distributed to a comparatively small number of the specified users, the processing skips to the step S76 to set the third bit $D_3$ of the identification code to 1 to supply such input information to the information transmission network selecting circuit 13.

The information transmission network selecting circuit 13 executes the processes in flowchart shown in FIG. 19 for the information supplied from the information identifying circuit 91 or the specified user information identifying circuit 93.

Namely, first, in the step S91, it is determined whether the first bit $D_1$ of the identification code of the input information is 1. When the first bit $D_1$ is 1, namely, when the the information is to be distributed to users, the processing skips to the step S92 to determine whether the second bit $D_2$ is 0, that is, whether the information is to be distributed to unspecified users. When the second bit $D_2$ is 0, it means that the input information is to be distributed to unspecified users and therefore the processing skips to the step S94 to supply the input information to the first transmitting circuit 14.

In the step S92, when the second bit $D_2$ is not 0, that is, the bit is 1, it means that the input information is to be distributed to the specified users. Therefore, the processing skips to the step S93 to determine whether the third bit $D_3$ is 0. When the third bit $D_3$ is 0, since the input information means the information of a small amount or the information to be distributed to a comparatively large number of the specified users distributed in a wider range, the processing skips to the step S94 to supply the input information to the first transmitting circuit 14.

On the other hand, when the third bit $D_3$ is not 0, that is, the bit is 1, it means that the input information is to be a comparatively small amount of information or the information to be distributed to a comparatively small number of the specified users. Therefore, the processing skips to the step S97 to supply the input information to the second transmitting circuit 15.

In the step S91, when the first bit $D_1$ of the identification code of the input information is not 1, that is, the bit is 0, the processes in the steps S95 and S96 are executed. These processes in the steps S95 and S96 are substantially the same as those in the steps S92 and S93.

Therefore, the information received from users and supplied from the processing circuit 18 is also outputted to the first transmitting circuit 14 when this information is to be distributed to unspecified users. Or, even when the information is to be distributed to the specified users, if it is a large amount of information or the information to be distributed to a comparatively large number of the specified users located in a wider range, such input information is outputted to the first transmitting circuit 14.

On the other hand, when the information is determined to be the information of a small amount to be distributed to the specified users or the information to be distributed to a comparatively small number of users, such input information is outputted to the second transmitting circuit 15.

As explained above, in the information transmission network selecting circuit 13 of the service offering center 1, the input information can automatically be identified as the first information or second information corresponding to the identification code set by the receiving information identifying circuit 92 or the specified user information identifying circuit 93.

While the preferred embodiments of the present invention have been described above, the present invention is not limited thereto and allows various modifications and changes without departure from the spirit and scope thereof. For instance, the information offered to user apparatus 6 from the service offering center 1 may be a video information such as a motion picture and may be a shopping information. The information offered is not particularly restricted.

What is claimed is:

1. An information communication system comprising:
    transmitting means for transmitting first and second information to be offered to users, said transmitting means includes selecting means, wherein said transmitting means transmits said first and second information through said selecting means;
    at least one terminal apparatus for receiving said first and second information transmitted from said transmitting means, said terminal apparatus including storing means for storing the transmitted first and second information;
    a communication network for connecting said transmitting means and said terminal apparatus, said communication network including:
        a first communication transmission network for transmitting said first information from said transmitting means to said terminal apparatus,
        second communication transmission network for transmitting said second information from said transmitting means to said terminal apparatus, and
        a third communication transmission network for transmitting third information from said terminal apparatus to said transmitting means;
    said selecting means supplies said first information to said first communication transmission network and also supplies said second information to said second communication transmission network; and
    said transmitting means further comprising:
        first adding means for adding an identification information regarding distribution of the first and second information supplied to said transmitting means, wherein said selecting means identifies the first information and second information depending on the identification information added by said first adding means to selectively supply said first information and second information to said first communication transmission network and said second communication transmission network,
        receiving means for receiving the third information supplied through said third communication transmission network,
        discriminating means for discriminating a kind of the third information received by said receiving means, and
        second adding means for adding an identification information regarding distribution of the third information that is discriminated by the discriminating means to be fed back to said terminal apparatus, wherein the information outputted from said second adding means is supplied to said selecting means.

2. An information communication system comprising:
    transmitting means for transmitting first and second information to be offered to users, said transmitting means includes selecting means for identifying information supplied as first information and second information depending on identification information thereof;
    at least one terminal apparatus for receiving the first and second information transmitted from said transmitting means, said terminal apparatus further comprising storing means for storing the transmitted first and second information;
    a communication network connecting said transmitting means and said terminal means, said communication network including:
        first and second communication transmission networks for transmitting said first information and said second information to said terminal apparatus from said transmitting apparatus, and
        a third communication transmission network for transmitting third information to said transmitting apparatus from said terminal apparatus, wherein a communication capacity of said first communication transmission network is higher than that of said second communication transmission network;
    said selecting means supplies said first information to said first communication transmission network and also supplies said second information to said second communication transmission network; and
    said transmitting means further comprises:
        first adding means for adding an identification information regarding distribution of the first and second information supplied to said transmitting means, wherein said selecting means identifies the first information and second information depending on the identification information added by said first adding means to selectively supply said first information and second information to said first communication transmission network and said second communication transmission network,
        receiving means for receiving the third information supplied through said third communication transmission network,
        discriminating means for discriminating a kind of the third information received by said receiving means, and
        second adding means for adding an identification information to the third information regarding distribution of the third information to be fed back to said terminal apparatus, wherein the information outputted from said second adding means is supplied to said selecting means.

3. An information communication system comprising:
    transmitting means for transmitting first and second information to be offered to users, said transmitting means including selecting means and first adding means, said first adding means for adding identification information regarding distribution of the first and second information supplied, and said transmitting means transmitting the first information and the second information respectively having different kinds of identification information;

at least one terminal apparatus for receiving the first and second information transmitted from said transmitting means, said terminal apparatus further comprising storing means for storing the transmitted first and second information;

a communication network for connecting said transmitting means and said terminal apparatus, said communication network including:

a first communication transmission network for transmitting the first information from said transmitting means to said terminal apparatus, a second communication transmission network for transmitting the second information from said transmitting means to said terminal apparatus, and a third communication transmission network for transmitting third information from said terminal apparatus to said transmitting means;

said selecting means supplies the first information to said first communication transmission network and the second information to said second communication transmission network depending on the identification code added by said first adding means; and said transmitting means further comprises:

receiving means for receiving the third information supplied through said third communication transmission network, discriminating means for discriminating a kind of the third information received by said receiving means, and second adding means for adding identification information regarding distribution of the third information to be fed back to said terminal apparatus, wherein the information outputted from said second adding means is supplied to said selecting means.

4. A transmitter that is connected to at least one terminal apparatus through first, second and third communication transmission networks, said transmitter comprising:

discriminating means for discriminating information to be offered to users as first information and second information depending on identification information indicating distribution of the information, selecting means for selectively supplying the first information to the first communication transmission network and the second information to the second communication transmission network depending on a result of discrimination by said discriminating means, receiving means for receiving third information supplied from the terminal apparatus through the third communication transmission network, discriminating means for discriminating a kind of the third information received by said receiving means, and second adding means for adding identification information regarding distribution of the third information to be fed back to said terminal apparatus, wherein the third information outputted from said second adding means is supplied to said selecting means.

* * * * *

UNITED STATES PATENT AND TRADEMARK OFFICE
CERTIFICATE OF CORRECTION

PATENT NO.: 5,818,911
DATED: October 6, 1998
INVENTOR(S): ISAO KAWASHIMA

It is certified that an error appears in the above-identified patent and that said Letters Patent is hereby corrected as shown below:

Column 15, line 41, at the beginning of the line, add --a-- before "second".

Signed and Sealed this

Nineteenth Day of January, 1999

Attest:

Attesting Officer

*Acting Commissioner of Patents and Trademarks*